(12) United States Patent
Potharaju et al.

(10) Patent No.: US 12,255,772 B2
(45) Date of Patent: Mar. 18, 2025

(54) LOCAL BREAKOUT OF USER PLAN FUNCTION AT ENTERPRISE 5G RADIO ACCESS NETWORK

(71) Applicant: Cisco Technology, Inc., San Jose, CA (US)

(72) Inventors: Shailender Potharaju, Fremont, CA (US); Arun G. Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/469,676

(22) Filed: Sep. 19, 2023

(65) Prior Publication Data

US 2024/0007349 A1 Jan. 4, 2024

Related U.S. Application Data

(63) Continuation of application No. 17/491,107, filed on Sep. 30, 2021, now Pat. No. 11,777,795.

(51) Int. Cl.
| | |
|---|---|
| *H04L 41/0806* | (2022.01) |
| *H04L 61/5014* | (2022.01) |
| *H04L 67/141* | (2022.01) |
| *H04W 88/08* | (2009.01) |

(52) U.S. Cl.
CPC ...... *H04L 41/0806* (2013.01); *H04L 61/5014* (2022.05); *H04L 67/141* (2013.01); *H04W 88/08* (2013.01)

(58) Field of Classification Search
CPC . H04L 41/0806; H04L 41/08; H04L 41/0803; H04L 61/50; H04L 61/5007; H04L 61/5014; H04L 67/14; H04L 67/141; H04W 36/00; H04W 36/08; H04W 28/0831; H04W 28/0835; H04W 28/0842; H04W 76/00; H04W 76/10
See application file for complete search history.

(56) References Cited

U.S. PATENT DOCUMENTS

| | | | |
|---|---|---|---|
| 10,172,063 B1 * | 1/2019 | Balmakhtar | H04W 36/22 |
| 11,632,696 B2 * | 4/2023 | Wang | H04W 36/0027 370/331 |

(Continued)

FOREIGN PATENT DOCUMENTS

| | | |
|---|---|---|
| WO | 2019160546 A1 | 8/2019 |
| WO | 2020036882 A1 | 2/2020 |

(Continued)

OTHER PUBLICATIONS

International Search Report and Written Opinion for International Application No. PCT/US2022/077239, mailed Jan. 4, 2023, 13 Pages.

*Primary Examiner* — Warner Wong
(74) *Attorney, Agent, or Firm* — Polsinelli P.C.

(57) ABSTRACT

The disclosure provides a method for providing an enterprise gNB for connection to a 5G packet core network. The method includes provisioning the enterprise gNB. The enterprise gNB hosts a local user plane function (L-UPF). The method also includes configuring the 5G packet core network comprising a session management function (SMF) to select the local user plane function to service user equipment (UE) connected to the enterprise gNB.

18 Claims, 21 Drawing Sheets

(56) References Cited

U.S. PATENT DOCUMENTS

| | | | |
|---|---|---|---|
| 2007/0171871 A1* | 7/2007 | Forsberg | H04W 12/04 713/171 |
| 2009/0180437 A1* | 7/2009 | Kanazawa | H04W 36/0016 370/331 |
| 2009/0193310 A1* | 7/2009 | Hashimoto | H04L 1/187 714/748 |
| 2009/0201881 A1* | 8/2009 | Chun | H04J 11/0069 370/331 |
| 2009/0239538 A1* | 9/2009 | Motegi | H04W 36/02 455/436 |
| 2009/0279507 A1* | 11/2009 | Kanazawa | H04W 36/249 370/332 |
| 2010/0027507 A1* | 2/2010 | Li | H04W 36/0058 370/331 |
| 2010/0195621 A1* | 8/2010 | Kekki | H04W 48/17 370/332 |
| 2011/0044290 A1* | 2/2011 | Kanazawa | H04W 36/304 370/332 |
| 2012/0177002 A1* | 7/2012 | Faucher | H04W 36/02 370/331 |
| 2020/0186490 A1* | 6/2020 | Bhaskaran | H04L 61/5014 |
| 2020/0228605 A1 | 7/2020 | Dodd-Noble et al. | |
| 2020/0305118 A1 | 9/2020 | Ryu et al. | |
| 2020/0367114 A1 | 11/2020 | Li et al. | |
| 2021/0084713 A1 | 3/2021 | Miklos et al. | |
| 2021/0112565 A1 | 4/2021 | Bhaskaran et al. | |
| 2021/0219359 A1* | 7/2021 | Lubenski | H04L 61/5007 |
| 2021/0400524 A1 | 12/2021 | Kahn et al. | |
| 2022/0038542 A1 | 2/2022 | Landais et al. | |
| 2022/0159501 A1 | 5/2022 | Chou et al. | |
| 2022/0217814 A1 | 7/2022 | Dhammawat et al. | |
| 2023/0042390 A1* | 2/2023 | Mildh | H04W 36/02 |

FOREIGN PATENT DOCUMENTS

| | | | |
|---|---|---|---|
| WO | 2020038560 A1 | 2/2020 | |
| WO | 2020041368 A1 | 2/2020 | |
| WO | 2020061527 A1 | 3/2020 | |
| WO | 2020096594 A1 | 5/2020 | |
| WO | 2020167820 A1 | 8/2020 | |
| WO | 2022235114 A1 | 11/2022 | |
| WO | 2023016653 A1 | 2/2023 | |
| WO | 2023032529 A1 | 3/2023 | |
| WO | 2023057081 A1 | 4/2023 | |
| WO | 2023057800 A1 | 4/2023 | |
| WO | WO-2023147856 A1 * | 8/2023 | H04W 36/0033 |

* cited by examiner

LOCAL BREAKOUT OF USER PLAN FUNCTION AT ENTERPRISE 5G RADIO ACCESS NETWORK

CROSS REFERENCE TO RELATED APPLICATIONS

This application is a continuation application of U.S. Non-Provisional patent application Ser. No. 17/491,107 filed Sep. 30, 2021, the disclosure of which is herein incorporated by reference in its entirety.

DESCRIPTION OF THE RELATED TECHNOLOGY

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
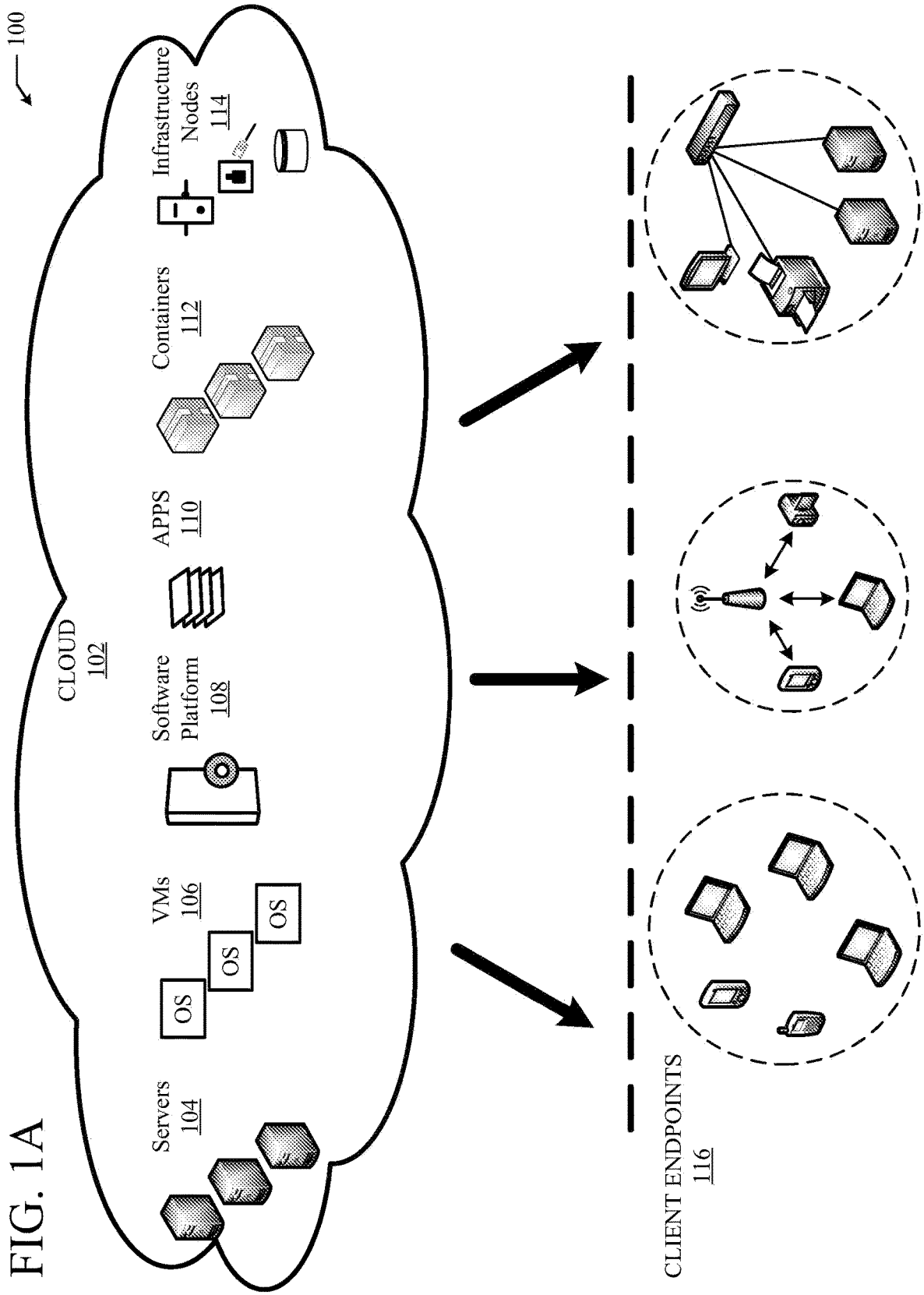
FIG. 1A illustrates an example cloud computing architecture in accordance with some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

In some examples, the present technology includes provisioning the enterprise gNB, wherein the enterprise gNB hosts a local user plane function (L-UPF). The present technology further includes configuring the 5G packet core network comprising a session management function (SMF) to select the local user plane function to service user equipment (UE) connected to the enterprise gNB. For example, the device name provisions the enterprise gNB, wherein the enterprise gNB hosts a local user plane function (L-UPF) configures the 5G packet core network comprising a session management function (SMF) to select the local user plane function to service user equipment (UE) connected to the enterprise gNB.

In another example, the present technology includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.). The present technology can cause the one or more processors to provision the enterprise gNB, wherein the enterprise gNB hosts a local user plane function (L-UPF). The present technology further can cause the one or more processors to configure the packet core network comprising a session management function (SMF) to select the local user plane function to service user equipment (UE) connected to the enterprise gNB.

Example Embodiments

The disclosed technology addresses an enterprise local breakout architecture. Additionally, the disclosed technology addresses UE IP address management and user plane data forwarding in the enterprise local breakout architecture. Additionally, the disclosed technology addresses seamless mobility in the enterprise local breakout architecture. Additionally, the disclosed technology address paging handling in the enterprise local breakout architecture. Additionally, the disclosed technology addresses multiple public data networks (PDN)/data network name (DNN) support in the enterprise local breakout architecture. The present technology involves systems, methods, and computer-readable media for the enterprise local breakout architecture.

Shared and unlicensed spectrums are paving way for 5G to be deployed in Enterprise networks for addressing various use cases requiring privacy, determinism, connection reliability, etc. Alternatively, 5G can also provide high throughputs which were previously only achievable with WiFi. Due to the growing adoption of 5G and the relatively small size of coverage areas from any 5G access radio, enterprise networks need to add 5G access radios. For 5G to be successful in enterprise networks, an end-to-end solution needs to be cost-effective, simple to deploy and manage. Ideally, since enterprises already manage W-Fi access networks, and associated network traffic, it would be helpful if 5G management might have some similarities to Wi-Fi infrastructure. However, to make this happen, there are challenges that need to be resolved without deviating much from 5G specifications and standards.

The disclosure provides an enterprise local breakout architecture that breaks out portions of the 5G core network and incorporates it into the 5G radio access network (RAN) to provide properties more similar to Wi-Fi access points (AP). The enterprise local breakout architecture includes both control plane functionality and management functionality including Access and Mobility Management Function (AMF) and Session Management Function (SMF) in a cloud, and user plane function (UPF) collocated at gNB, which has the desired consequence of allowing IP address management and network switching that is more similar to enterprise Wi-Fi architecture.

The enterprise local breakout architecture simplifies the 5G network by implementing the control plane function of the packet core into a centralized facility, such as a public cloud, and by implementing all user plane functions (UPF) into RAN/gNB. The enterprise local breakout architecture treats the RAN like any other wireless access point (AP) without having to deploy additional elements on-premise for the 5G network to be operational. A UE gets authenticated by the AMF/AUSF (Authentication Server Function)/UDM (Unified Data Management) entities in the cloud and local breakout of the UPF at the gNB. This allows communication between 5G users and enterprise devices on wired LAN, such as printers, i.e. direct communication via the gNB. The control plane function (CPF) can be offered as a service to the 5G users or enterprise customers.

In the enterprise local breakout architecture of the present technology, data enters at one UPF and gets distributed across multiple gNBs depending upon where the UE is. The architecture simplifies UE IP address management and provides seamless UE mobility between gNBs. One gNB can provide radio coverage to a finite area depending upon radio characteristics. Many gNBs may be required to cover one enterprise facility.

By implementing the UPF(s) at each gNB, many UPF instances are in a single deployment, which complicates the UE IP address management and user plane data forwarding. The disclosure provides a method for UE IP address management and user plane data forwarding.

By implementing the UPF(s) at each gNB, many UPF instances are in a single deployment, which complicates seamless mobility/data session continuity. The IP address assigned to the UE needs to be retained across all gNBs, in order to maintain session continuity during handover. The disclosure provides a method for seamless mobility/data session continuity in the enterprise local breakout architecture.

By implementing the UPF(s) at each gNB, many UPF instances are in a single deployment, which also complicates paging handling. The disclosure provides a solution to UE paging in the enterprise local breakout architecture.

By implementing the UPF(s) at each gNB, many UPF instances are in a single deployment, which also complicates multiple PDN/DNN support. The enterprise local breakout architecture includes a plurality of vLANs for a corresponding plurality of DNNs. The L-UPF at the gNB maintains a forwarding context for each of the plurality of DNNs. The forwarding UE context includes the IP address for the UE for each of the plurality of DNNs received from the enterprise Dynamic Host Configuration Protocol (DHCP) server. The multiple PDN/DNNs allow support for independent services, such as voice, video, and data services, among others.

The enterprise local breakout architecture offers lower end-to-end user plane latency, faster idle to connected mode transition, improved paging time, higher system-level throughputs than a traditional 5G architecture. Other benefits offered by the enterprise local breakout architecture include lower latency, aggregate higher throughput than a traditional UPF. The traditional UPF has an upper limit on the throughput supported, which gets divided among several gNBs when all the gNBs are fully loaded. With the enterprise local breakout architecture, each gNB can support up to its maximum capacity. Edge computing involving DPI and correlation with RAN metrics can be efficiently implemented in the architecture as the gNB and the UPF are collocated.

A description of network environments and architectures for network data access and services, as illustrated in FIGS. 1A, 1B, 2A, and 2B is first disclosed herein. A discussion of systems, methods, and computer-readable medium for the enterprise local breakout architecture, as shown in FIGS. 3-15, will then follow. The discussion then concludes with a brief description of example devices, as illustrated in FIG. 16. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an Internet-of-things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
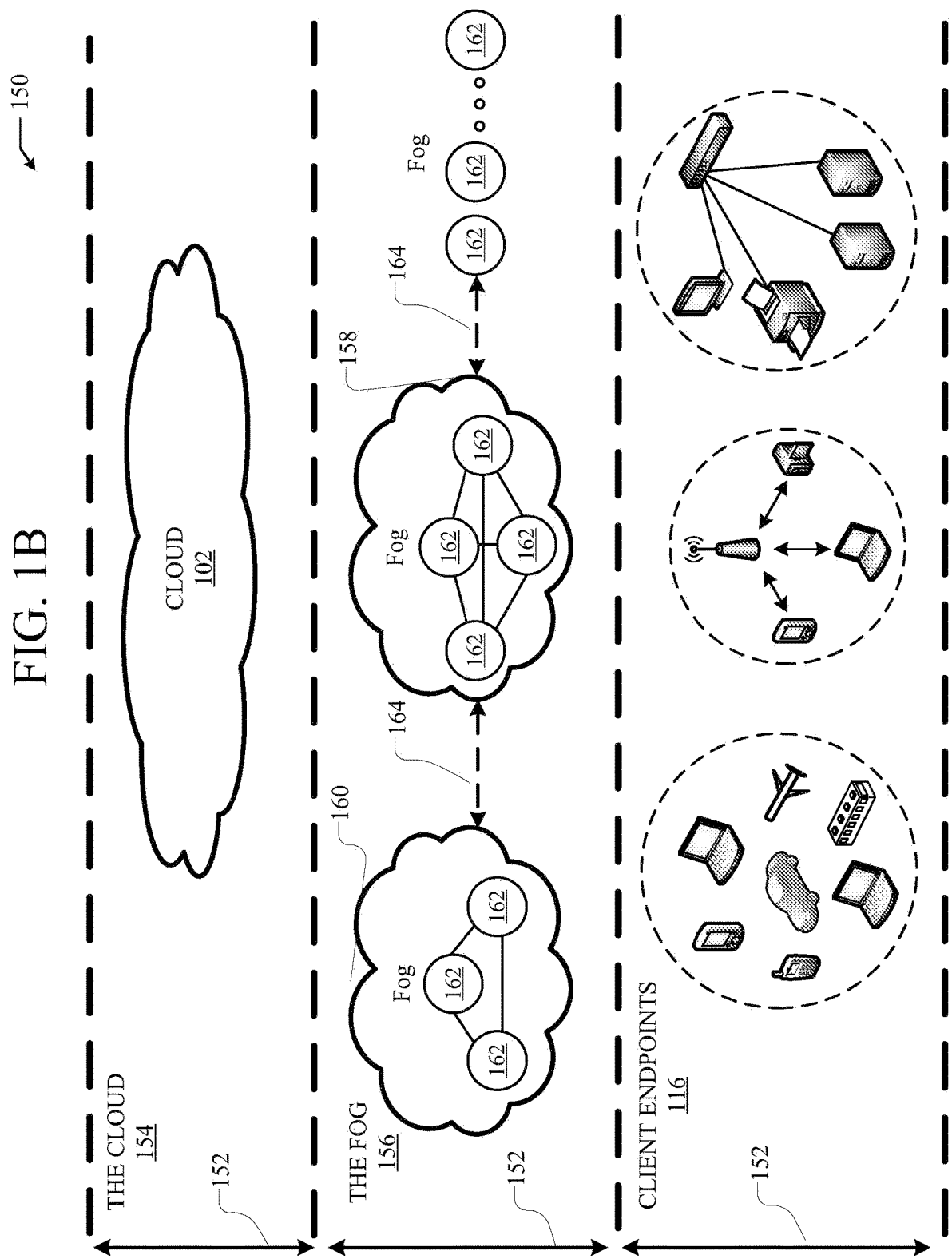
FIG. 1B illustrates an example fog computing architecture in accordance with some aspects of the disclosed technology.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage, and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh, or hierarchical arrangements, for example.

In some cases, one or more fog nodes 162 can be mobile fog nodes. The mobile fog nodes can move to different geographic locations, logical locations, or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
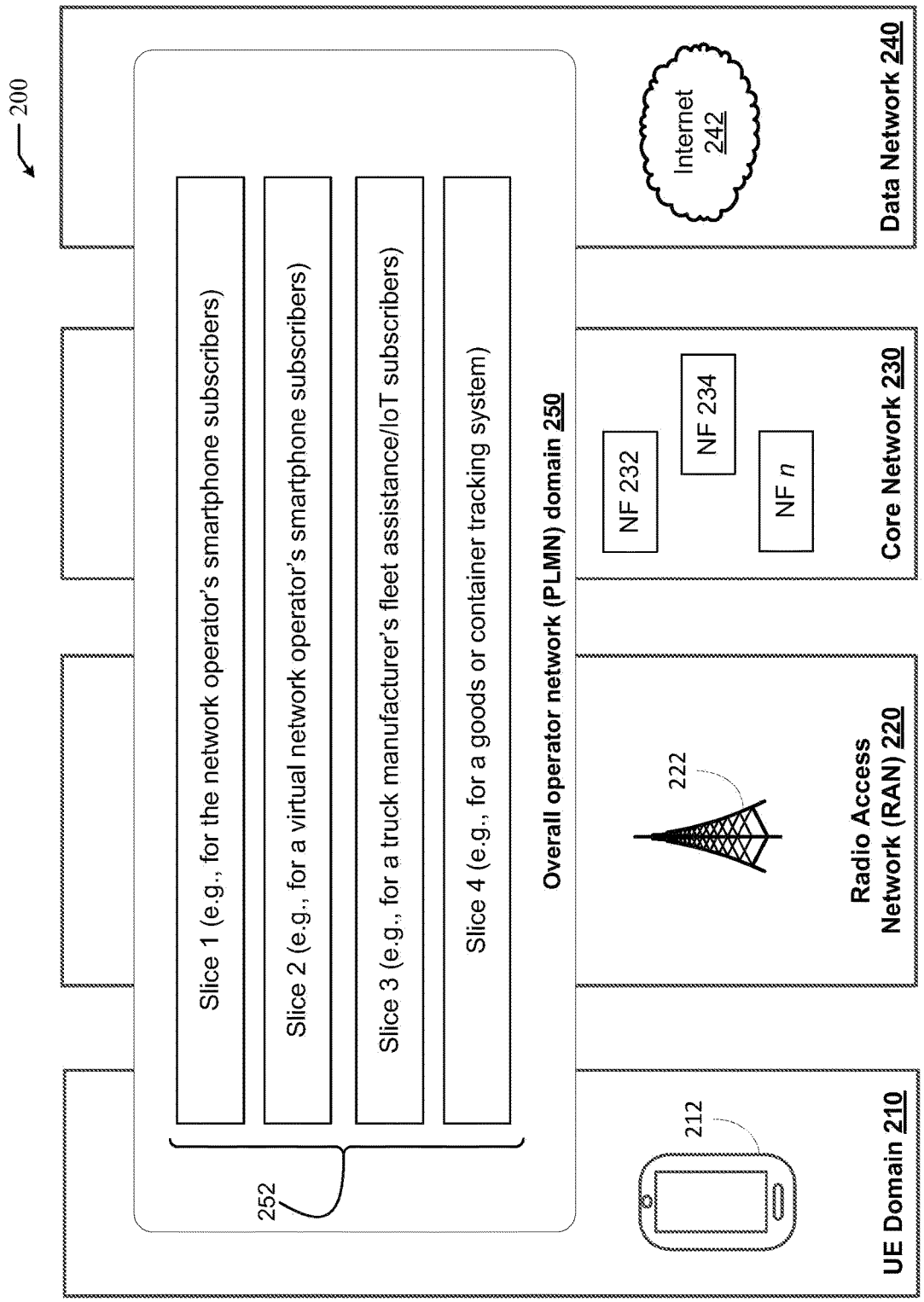
FIG. 2A depicts an example schematic representation of a 5G network environment in which network slicing has been implemented in accordance with some aspects of the disclosed technology.

FIG. 2A depicts an exemplary schematic representation of a 5G network environment in which network slicing has been implemented, and in which one or more aspects of the present disclosure may operate, according to some aspects of the present disclosure. In some examples, the 5G network environment 200 can be utilized to implement the cloud 102 of FIG. 1A and/or the fog computing architecture 150 of FIG. 1B.

As illustrated, network environment 200 is divided into four domains, each of which will be explained in greater depth below; a User Equipment (UE) domain 210, e.g. of one or more enterprises, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some example embodiments, core network 230 is a 5G core network (5GC) in accordance with one or more accepted 5GC architectures or designs. In some example embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some example embodiments, the plurality of NFs of core network 230 can include one or more Access and Mobility Management Functions (AMF), typically used when core network 230 is a 5GC network) and Mobility Management Entities (MME), typically used when core network 230 is an EPC network), collectively referred to herein as an AMF/MME for purposes of simplicity and clarity. In some example embodiments, an AMF/MME can be common to or otherwise shared by multiple slices of the plurality of network slices 252, and in some example embodiments an AMF/MME can be unique to a single one of the plurality of network slices 252.

Similarly, the remaining NFs of core network 230 can be shared amongst one or more network slices or provided as a unique instance specific to a single one of the plurality of network slices 252. In addition to NFs including an AMF/MME as discussed above, the plurality of NFs of the core network 230 can include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across the four domains of the 5G network environment 200, an overall operator network domain 250 is defined. The operator network domain 250 is in some example embodiments a Public Land Mobile Network (PLMN), a private 5G network and/or a 5G enterprise network, and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN), a private 5G network and/or a 5G enterprise network for providing services to UEs. This network slicing permits for the controlled composition of the network with the specific network functions and provided services that are required for a specific usage scenario. In other words, network slicing enables a 5G network operator to deploy multiple, independent 5G networks where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

Figure 2B:
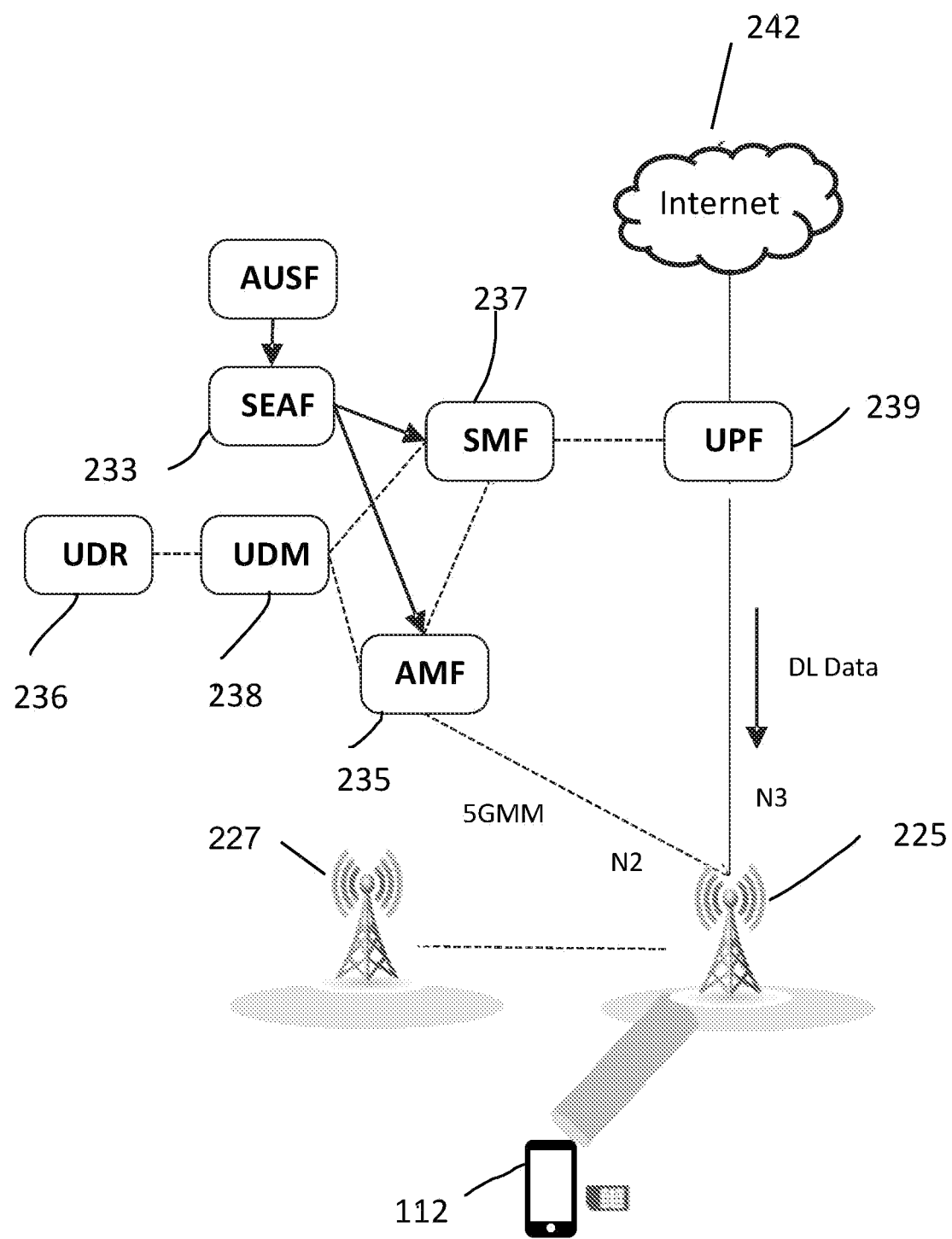
FIG. 2B illustrates an example 5G network architecture according to some aspects of the present technology.

FIG. 2B illustrates an example 5G network architecture. As addressed above, a User Equipment (UE) 212 can connect to a radio access network provided by a first gNodeB (gNB) 225 or a second gNB 227.

The gNB 225 can communicate over a control plane N2 interface with an access mobility function (AMF) 235. AMF 235 can handle tasks related to network access through communication with a unified data management (UDM) function 238 which accesses a user data repository (URD) 236 that can contain user data such as profile information, authentication information, etc. Collectively AMF 235 and UDM 238 can determine whether a UE should have access and any parameters on access. AMF 235 also works with SEAF 233 to handle authentication and re-authentication of the UE 212 as it moves between access networks. The SEAF and the AMF could be separated or co-located.

Assuming AMF 235 determines the UE 212 should have access to a user plane to provide voice or data communications, AMF 235 can select one or more service management functions (SMF) 237. SMF 237 can configure and control one or more user plane functions (UPF) 239. Control plane communications between the SMF 237 and the gNB 225 (or 227) also need to be encrypted. SEAF 233 can provide a security key to SMF 237 for use in encrypting control plane communications between the SMF 237 and the gNB 225 (or 227).

As noted above SMF 237 can configure and control one or more user plane functions (UPF) 239. SMF 237 communicates with UPF 239 over an N4 Interface which is a bridge between the control plane and the user plane. SMF 237 can send PDU session management and traffic steering and policy rules to UPF 239 over the N4 interface. UPF 239 can send PDU usage and event reporting to SMF 237 over the N4 interface.

UPF 239 can communicate user plane data or voice over the N3 interface back to UE 212 through gNB 225. There can be any number of UPFs handling different user plane services. Most commonly there would be at least one UPF for data service and at least one UPF for voice service.

By implementing UPF at each gNB, many UPF instances are in a single deployment, which complicates the UE IP address management and user plane data forwarding. Typically, a UE IP address pool is maintained by SMF, which allocates IP address to a UE during UE Registration/PDU (Protocol Data Unit) session establishment process. SMF then configures UPF with traffic classification rules and traffic policies for the IP address. UPF acts as a router for the subnet allocated to the UE. IGP/BGP protocols can be used to publish these routes into the network. When the traffic for the UE is received from the network, the traffic is classified and the IP payload alone is forwarded to the gNB where the UE is connected over a GTPu tunnel. Similarly, when data are received in an uplink over the GTPu tunnel, UPF appends a MAC header and routes the data to the next hop. In the context of local UPF collocated at a gNB, maintaining one UE IP address pool per gNB will not be scalable and manageable as multiple gNBs exist in a facility. Routing/Packet forwarding would have similar implications.

The disclosure provides an enterprise local breakout architecture that performs UE IP address management and user plane data forwarding.

Figure 3:
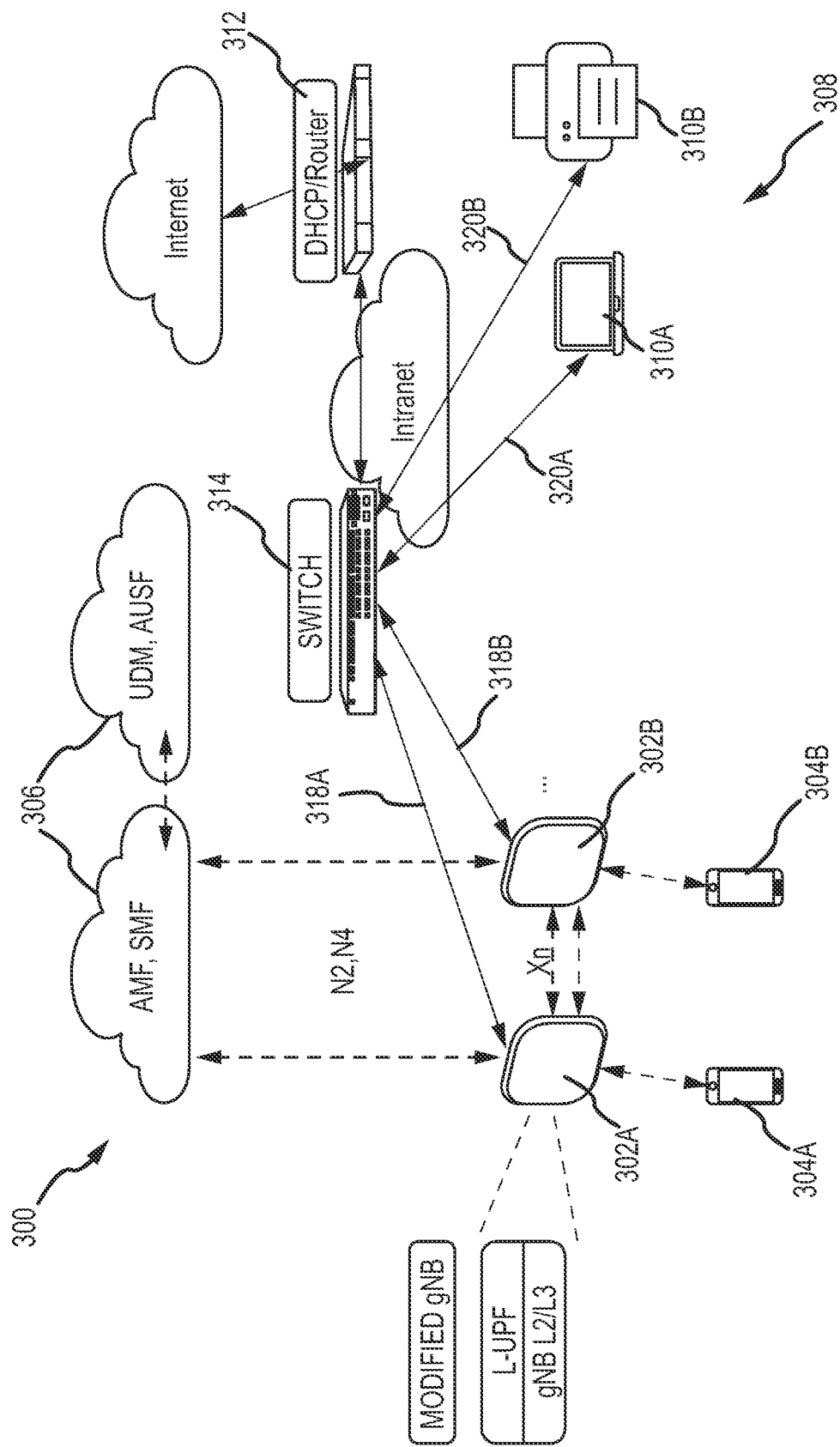
FIG. 3 illustrates an Enterprise local breakout architecture in accordance with some aspects of the disclosed technology.

FIG. 3 illustrates an enterprise local breakout architecture, in accordance with some aspects of the disclosed technology. As illustrated in FIG. 3, first and second radio base stations or gNBs 302A and 302B are modified gNBs, each of which includes a local user plane function (L-UPF) located at the gNB. As illustrated, a first user equipment (UE) 304A is near the first gNB 302A, while a second UE 304B is near the second gNB 304B. The first gNB 302A has a control plane interface Xn with the second gNB 302B. The first gNB 302A also has a user plane interface 316 with the second gNB 302B.

In an enterprise local breakout architecture 300, control plane function (CPF), AMF, and SMF are included in a cloud 306 and are controlled by a 5G core network administrators. As illustrated, the gNBs 302A and 302B have a control plane N2 interface with the AMF in the cloud 306. The L-UPFs at the gNBs 304A-B have a control plane N4 interface with the SMF in the cloud 306. The L-UPF at the gNB 302A has a user plane communication 318A with a network device 314 (e.g. switch), which may switch the user plane communication 318A to different devices 310A or 310B, including PCs, printers, servers, among others, through user plane communications 320A or 320B.

In the enterprise local breakout architecture 300, an enterprise-managed DHCP server 312 is in communication with the network device 314 via the intranet.

In the enterprise local breakout architecture 300, an enterprise network 308 includes the devices 310A and 310B, network device 314, and DHCP server 312. The enterprise network 308 also includes the gNBs 302A-B.

Local breakout by implementing L-UPF at gNB enables the UE to break out Internet sessions into the enterprise network 308 to provide inbound roaming with an ability to order data, which is provided directly by the enterprise network 308.

IP address allocation from the enterprise-managed DHCP server 312 eliminates the need for maintaining an IP address pool per local UPF/gNB, also eliminates additional routes that need to be installed for each subnet that gets managed by each local UPF or L-UPF. Common IP address assignment by DHCP server 312 also works well in supporting session continuity when a UE is transitioning from one L-UPF/gNB instance to another L-UPF/gNB instance at the time of handover.

The L-UPF at gNB 302A or 302B makes an IP address request towards the enterprise DHCP server 312 on behalf of the UE 304A or 304B at the time of Protocol Data Unit (PDU) session creation and passes the IP address to the UE. The IP address of the UE is retained as long as the UE is either in a connected mode or in an idle mode. The IP address of the UE is released when the UE deregisters with the Packet Core.

The enterprise device 310A or 310B on a wired side of the enterprise network 308 can communicate with the UE 304A or 304B on the 5G network using L2 forwarding, very similar to two ethernet devices communicating on the same subnet. The L-UPF where the UE is currently connected would act as an ARP proxy, by creating a binding between its own MAC address with the UE IP address. In this way, packets destined for the UE will be received by L-UPF, which, in turn, get transmitted over the wireless interface as IP packets. Similarly, when forwarding uplink packets received from a UE to another device 310A or 310B on the enterprise network, L-UPF appends a MAC header with its MAC address as the source.

When the UE 304A or 304B gets an IP address allocated during a PDU session establishment, the L-UPF instance of the gNB 302A or 302B broadcasts a Gratuitous Address Resolution Protocol (GARP) request to inform the binding of the IP address with its own Media Access Control (MAC) address. Subsequently, the L-UPF responds to address resolution protocol (ARP) requests for the UE IP address with its own MAC address.

Figure 4:
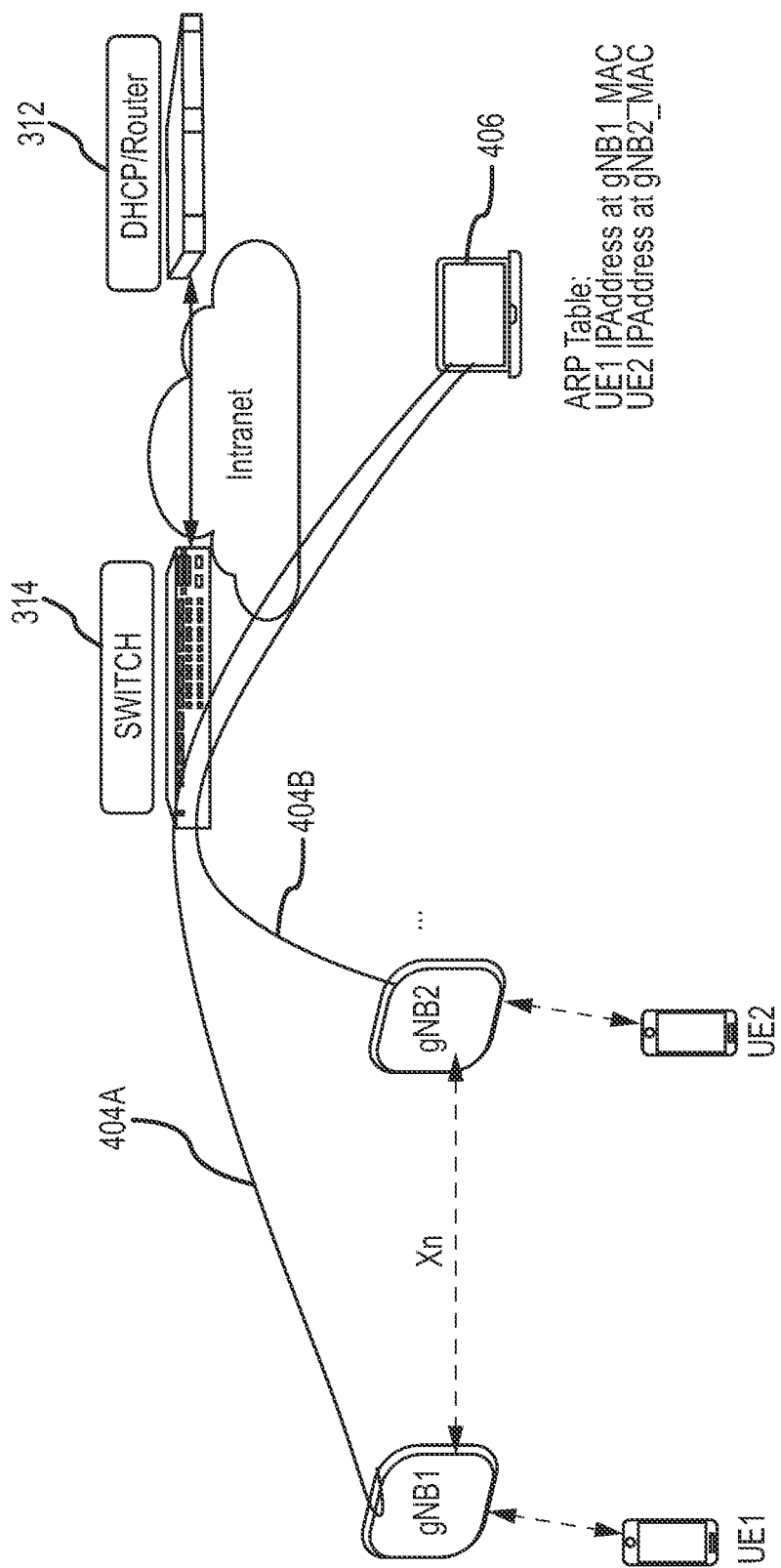
FIG. 4 is a system diagram illustrating user plane (U-plane)/data path after completing registration in accordance with some aspects of the disclosed technology.

FIG. 4 is a system diagram illustrating user plane (U-plane)/data path after completing registration, in accordance with some aspects of the disclosed technology. UE IP address management and packet forwarding are illustrated in FIG. 4. As illustrated, one 5G user or UE1 304A is connected to the first gNB1 and has a first IP address at gNB1_MAC, while another 5G user or UE2 304B is connected to the second gNB2, and has a second IP address at gNB2_MAC.

After completing registration, the UE1 and the UE2 gets data from an enterprise device 406 (e.g. PC) through network device 314 (e.g. switch, or router) and U-plane/data paths 404A and 404B, respectively.

Figure 5A:
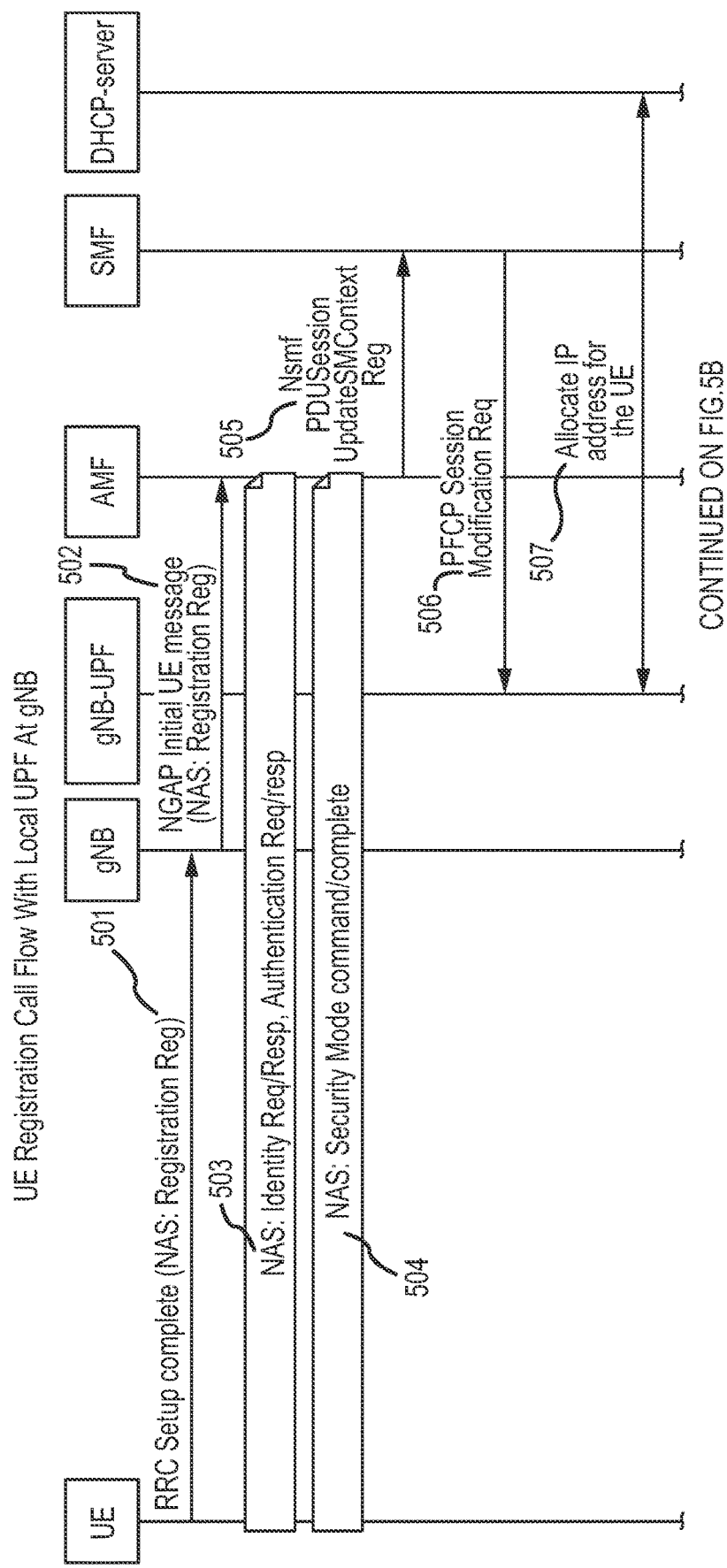
FIG. 5A is a first part of a sequence diagram depicting operations for UE Registration call flow in accordance with some aspects of the disclosed technology.
Figure 5B:
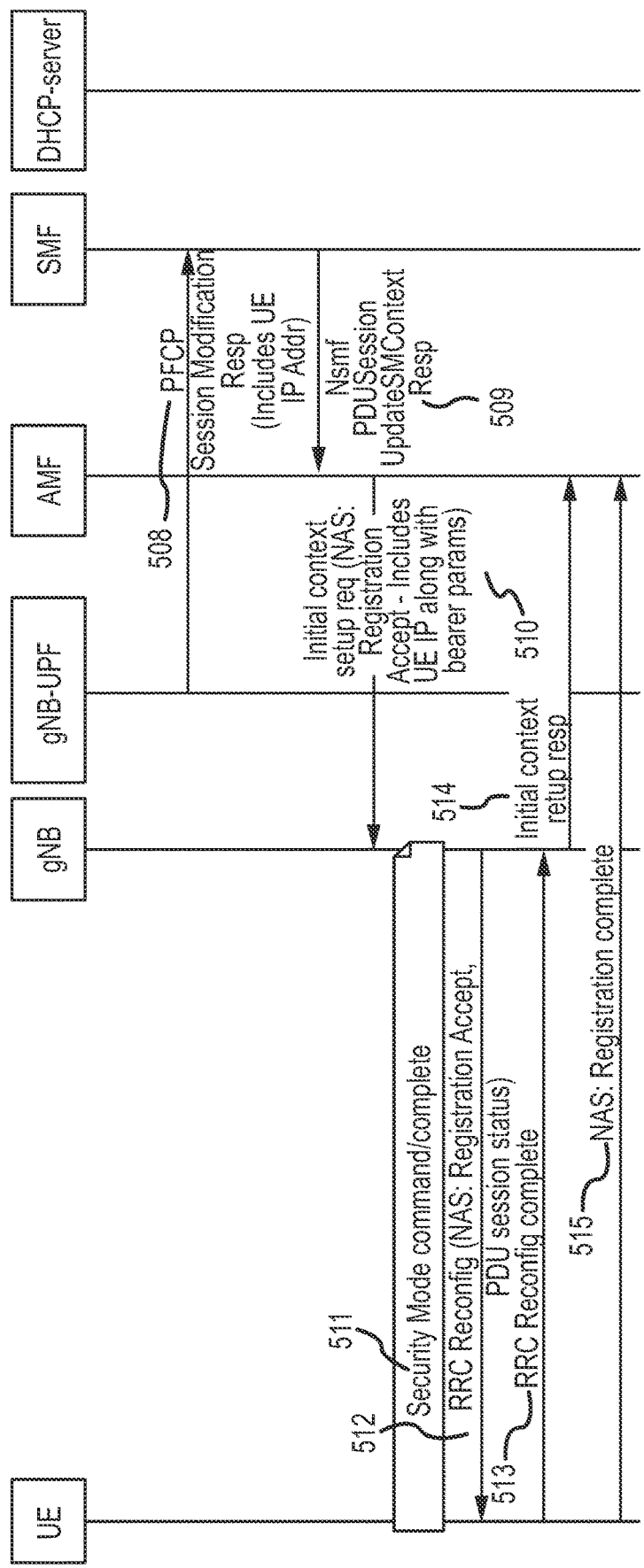
FIG. 5B is a second part of the sequence diagram depicting operations for UE Registration call flow in accordance with some aspects of the disclosed technology.

FIGS. 5A and 5B illustrate a first and second part of a sequence diagram depicting operations for UE Registration call flow, in accordance with some aspects of the disclosed technology. As shown on the top, multiple participants include UE, gNB, gNB-UPF, AMF, SMF, and DHCP-Server.

At operation 501, the UE sends a message "RRC Setup complete (NAS Registration Request" to the gNB where the UE is last connected to.

At operation 502, the gNB sends the AMF "NGAP Initial UE message (NAS: Registration Request)." The AMF uses NSSAI from NGSetup Request to determine whether the gNB is capable of supporting local breakout functionality, and reserves a number for slice type (ST) and slice descriptor (SD) for this purpose.

At 503, the UE communicates with the AMF, including NAS identity request and response, authentication request and response.

At 504, the NAS security mode command is complete.

At operation 505, the AMF sends the SMF "Nsmf PDUSession UpdateSMContext request."

At operation 506, the SMF sends the UPF "PFCP Session Modification request."

At operation 507, the UPF at the gNB allocates the IP address for the UE from the DHCP server 312.

At operation 508, the UPF sends SMF a "PFCP Session Modification response containing the UE IP address". Existing information elements, such as TED, F-SEID, etc., can be used to carry the UE IP address allocated from the local DHCP server 312.

At operation 509, the SMF sends the AMF a "Nsmf PDUSession UpdateSMContext Response."

At operation 510, the AMF sends the gNB an "Initial Context setup request (NAS-PDU: Registration Accept-includes UE IP address along with bearer parameters)."

At 511, security mode communication is complete.

At operation 512, the gNB sends the UE RRC reconfiguration (NAS: Registration Accept, PDU session status).

At operation 513, the UE informs the gNB "RRC reconfiguration complete."

At operation 514, the gNB sends the AMF "initial context setup response."

At 514, NAS registration is complete.

At 516, the gNB-UPF issues "GARP advertising UE IP to Local MAC address binding."

After 516, the UE and the gNB-UPF establish an end-to-end data session.

By implementing UPF at each gNB, many UPF instances are in a single deployment, which complicates seamless mobility/data session continuity. The IP address assigned to the UE needs to be retained across all gNBs, in order to maintain session continuity during handover. In 5G architecture, UPF acts as an anchor point for user plane traffic. As long as a single UPF instance is used, session continuity can be maintained while the user moves from one gNB to another gNB. The session needs to be re-established when a user moves from one UPF coverage area to another UPF coverage area. This seamless mobility/data session continuity needs to be addressed when the UPF is combined with gNB in order to support mobility in the network.

Figure 6:
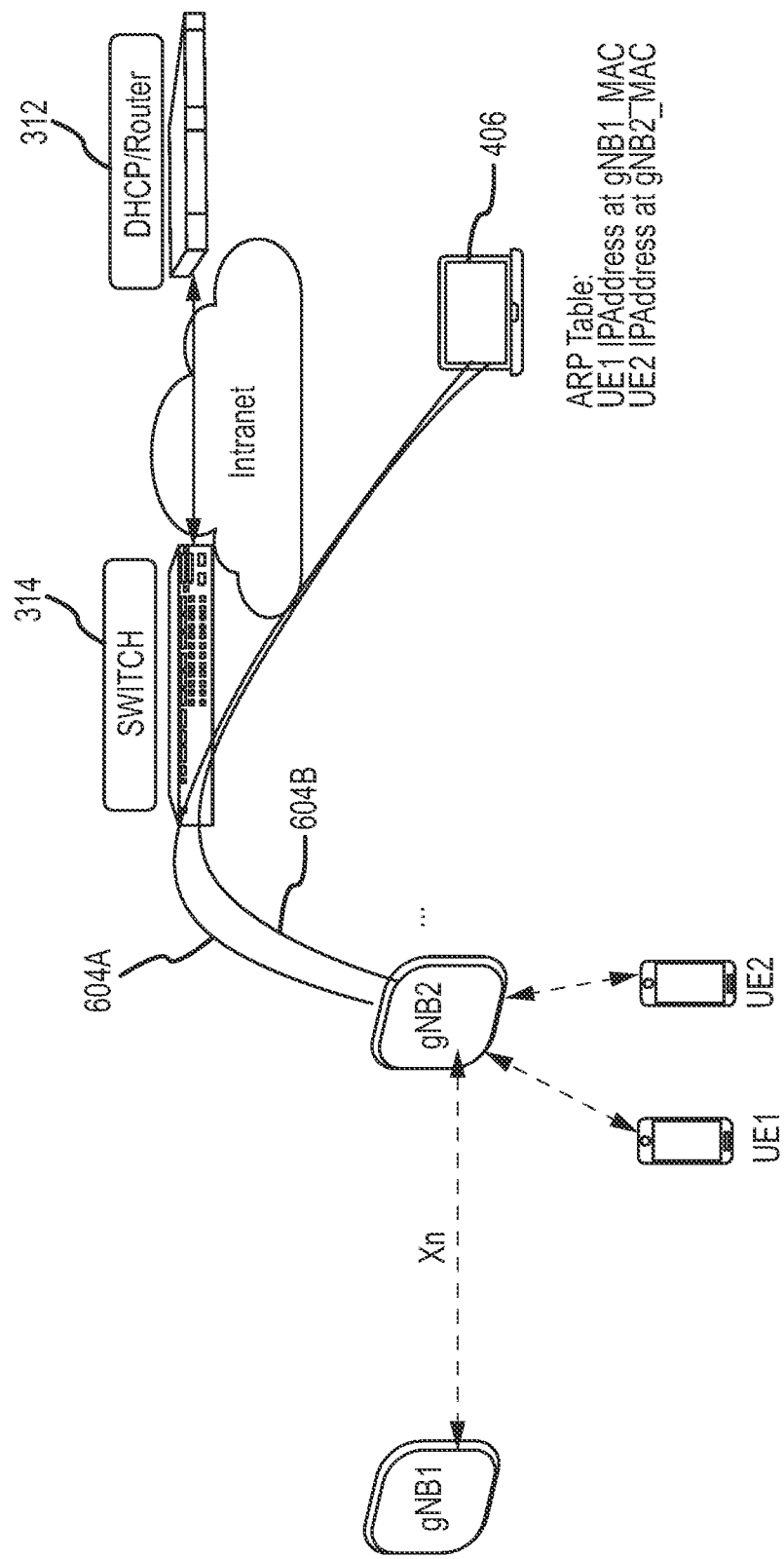
FIG. 6 is a system diagram illustrating U-plane/data path after user equipment (UE) moves from gNB1 to gNB2 in accordance with some aspects of the disclosed technology.
Figure 7A:
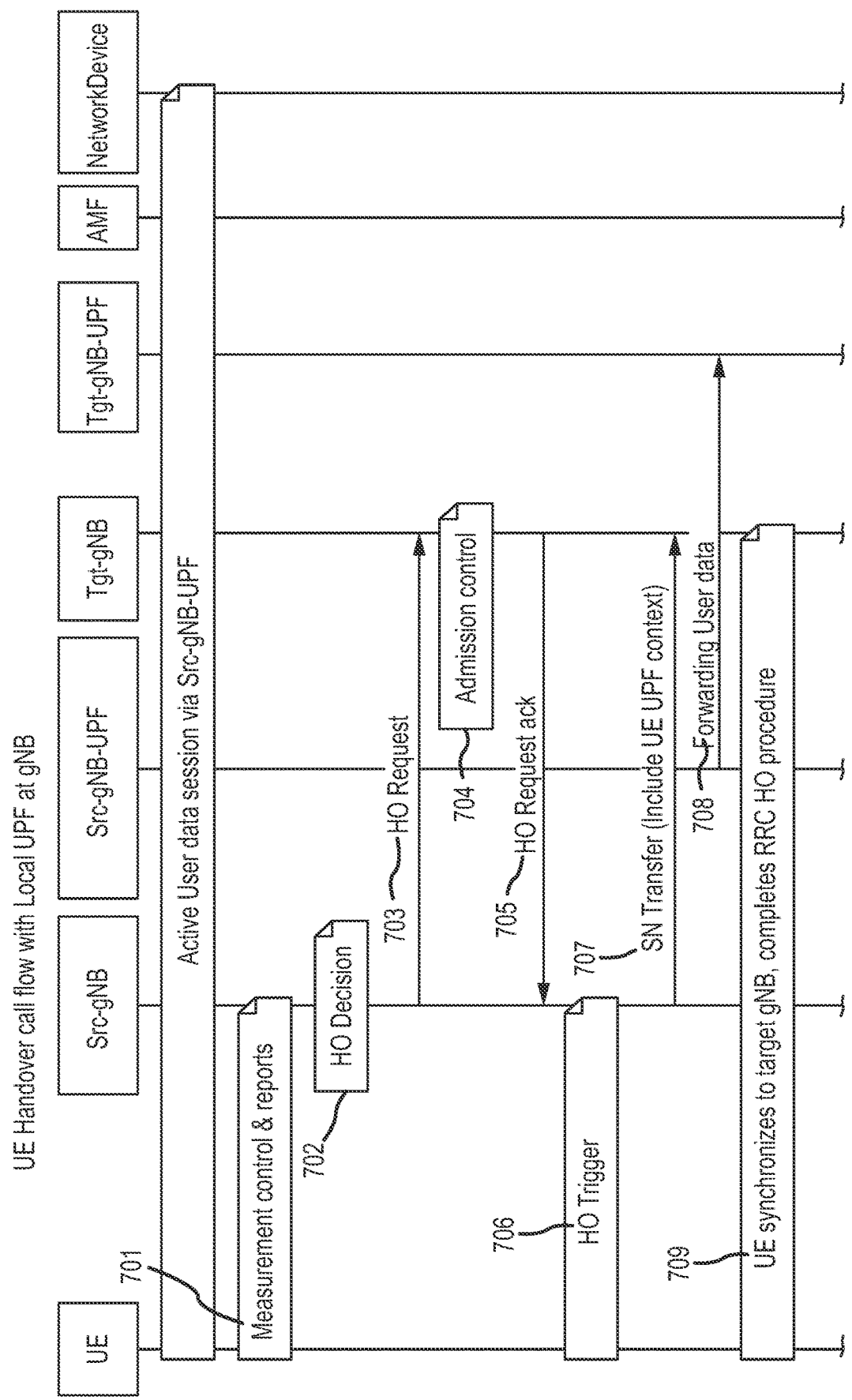
FIG. 7A is a first part of an example sequence diagram depicting operations for UE handover call flow from one gNB to another gNB in accordance with some aspects of the disclosed technology.
Figure 7B:
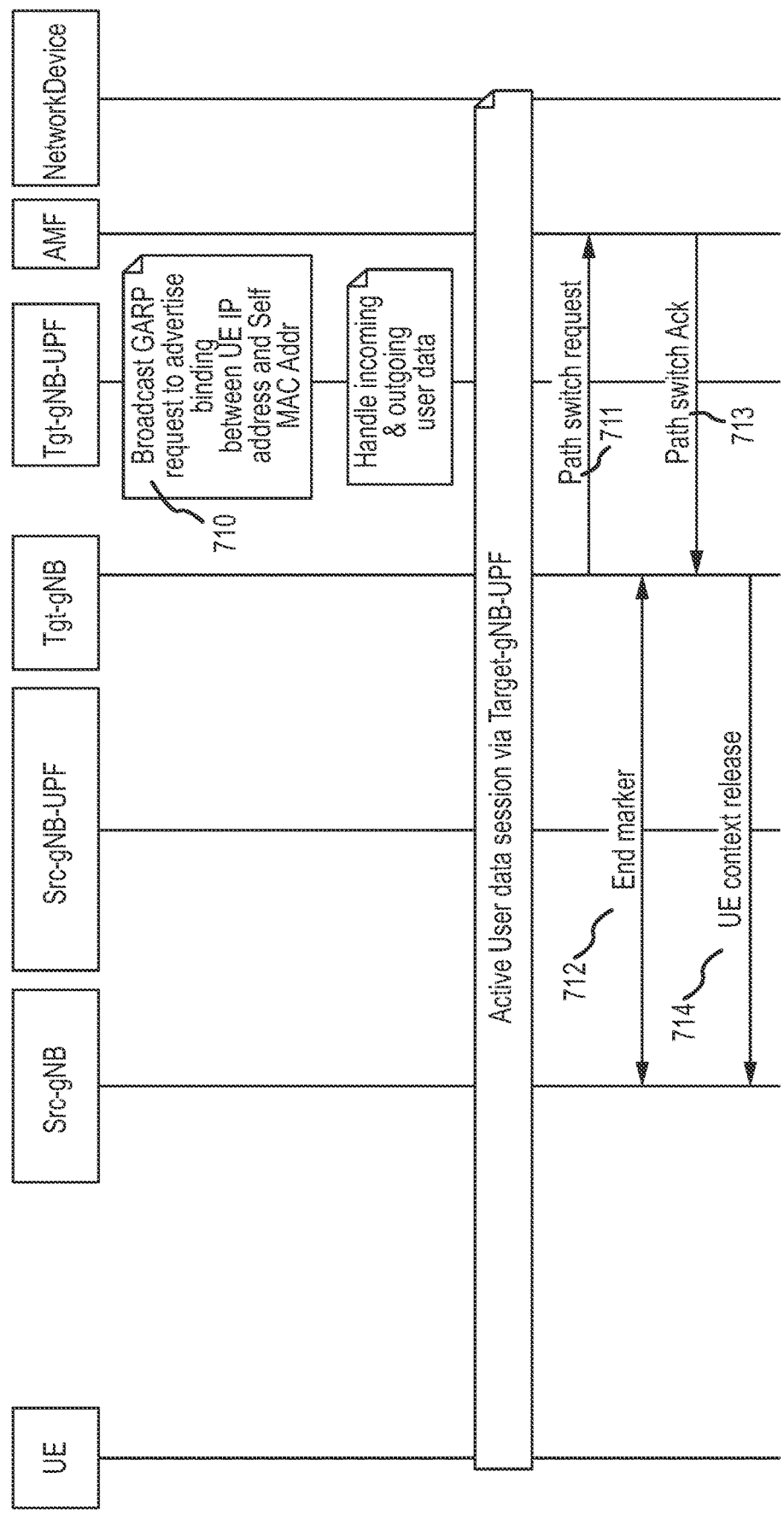
FIG. 7B is a second part of the example sequence diagram depicting operations for UE handover call flow from one gNB to another gNB in accordance with some aspects of the disclosed technology.

The enterprise local breakout architecture provides a solution for seamless mobility. FIG. 6 is a system diagram illustrating U-plane/data path after UE moves from gNB1 to gNB2, in accordance with some aspects of the disclosed technology. UE handover (HO), packet forwarding after the handover are shown in FIG. 6. As illustrated, the UE1 has moved from the first gNB1 to the second gNB2. Now, the UE1 has a U-plane/data path 604A to the enterprise device 406. The UE2 has a U-plane/data path 604B to the enterprise device 406.

The Xn-based inter-gNB handover mechanism can be leveraged to transfer the UPF context of the UE PDU session from the source gNB (e.g. gNB1 in FIG. 6) to the target gNB (e.g. gNB2 in FIG. 6). The UPF context contains the IP address assigned to the UE/PDU session, traffic policies, and traffic flow rules associated with the PDU session. A new proprietary information element (IE) to carry the UPF context needs to be introduced in the secondary node (SN) Status transfer message for this purpose.

As part of installing the UE context at the target gNB, the L-UPF instance gets updated with the UE UPF context from the source gNB. The UE context includes the UE IP address. Then, the L-UPF instance of the target gNB issues a GARP request to inform the new binding between the newly handover UE's IP address with its MAC address. The source gNB continues to forward data to the target gNB while the network devices 314 are updating their ARP caches.

FIGS. A and 7B illustrate a first and second part of an example sequence diagram depicting operations for UE handover call flow from one gNB to another gNB, in accordance with some aspects of the disclosed technology. As shown on the top, participants include UE, source-gNB (Src-gNB), Source-gNB-UPF, Target-gNB, Target-gNB-UPF, AMF, and Network Device. In the sequence diagram, the source is abbreviated as "Src." The target is abbreviated as "Tgt."

As shown right under the participants, an active user data session via source-gNB-UPF starts between the UE and the network device.

At 701, measurement control and report occur between the source-gNB and the UE.

At operation 702, the source-gNB makes a handover decision.

At operation 703, the source-gNB sends the target-gNB a handover (HO) request.

At 704, the target-gNB has admission control.

At operation 705, the target-gNB sends a HO request acknowledgment to the source-gNB.

At 506, the HO triggers between the UE and the source-gNB.

At operation 707, the source-gNB sends the target gNB "SN transfer including UE UPF context.

At operation 708, the source-gNB forwards user data to the target-gNB.

At 709, the UE synchronizes to the target-gNB and completes the RRC HO procedure.

At operation 710, the UPF at the target-gNB broadcasts a GARP request to advertise binding between the UE IP address and its MMC address.

At 711, the target-gNB handles incoming and outgoing user data.

Next, an active user data session starts via the target-gNB-UPF between the UE and the network device.

At operation 711, the target-gNB sends a path switch request to the AMF.

At 712, an end marker indicates that the source-gNB has finished handover to the target-gNB.

At operation 713, the AMF sends a patch switch acknowledgment to the target-gNB.

At 714, the target-gNB sends the source-gNB "UE context release."

By implementing UPF at each gNB, many UPF instances are in a single deployment, which also complicates paging handling. A downlink transmission for a UE triggers a paging procedure if the UE is in an idle mode. This works with the 5G defined centralized UPF model, where the wired side of the network sends user plane traffic to UPF. UPF triggers the paging procedure, with the aids of SMF and AMF, to all the gNBs in the tracking area. The UE in idle mode periodically wakes up and processes a paging message. If the UE detects the paging message, the UE transitions into a connected mode by executing a service request procedure.

When the Control Plane Function (CPF) is cloud-based and the UPF is collocated with gNB, the regular paging mechanism poses some challenges. The challenges include the paging message flooding on WAN backhaul as the SMF needs to talk to every gNB (L-UPF) in the enterprise network. The challenges also include that WAN latency affects paging delay, which increases the time for a UE to transition from an idle mode to a connected mode. The regular paging mechanism is not suitable for mission-critical applications.

The enterprise local breakout architecture 300 also provides a solution to UE paging. 5G has introduced an inactive mode, which is similar to an idle mode in LTE. The difference is that the idle mode UE context can be maintained at the gNB rather than at AMF/SMF. RAN-based Notification area (RNA) has been defined in 5G for this purpose. The source gNB can send paging notifications to neighboring gNBs in the RAN-based Notification area, like the AMF paging all the gNBs within a tracking area code (TAC) of a tracking area. This approach can be leveraged to support UE Paging locally at an enterprise level without involving the packet core. This UE paging reduces unnecessary paging updates going back and forth between the AMF in the cloud and the local UPF at a gNB. This UE paging also helps reduce the time taken for a UE to transition from an idle or inactive state to a connected state. In addition, unicast paging between the gNB can be replaced with multicast paging. In the multicast paging, a specific multicast address can be assigned per RAN-based Notification area. All the members or gNBs of the RAN-based Notification area subscribe to paging notifications over the specific multicast address.

While a UE is in an Inactive/Idle state, the UE context along with its UPF context is maintained at the gNB where it was connected last. When the L-UPF receives data from the devices 310A-B on the enterprise network, the L-UPF prepares a paging request and multicasts the paging request to all neighboring gNBs within the network that is part of the RAN based notification area. The neighboring gNBs derive the paging cycles of the UE from the received message, broadcast the paging message over the air accordingly. When the UE detects the paging message, the UE performs a service request. The neighboring gNB handling the service request retrieves the UE context along with its UPF context over Xn session from the source gNB.

In some embodiments, the enterprise local breakout architecture may segment the network with multiple tracking areas and RAN-based notification areas. In order to handle such cases, the source gNB can initiate a 5G defined paging procedure where the UPF sends a Data Indication message to the SMF. The AMF, in turn, can page all gNBs in the tracking area or coverage area where the UE was last connected. In order to reduce unnecessary floods, the source gNB can trigger this only after retrying local paging a couple of times.

Figure 8A:
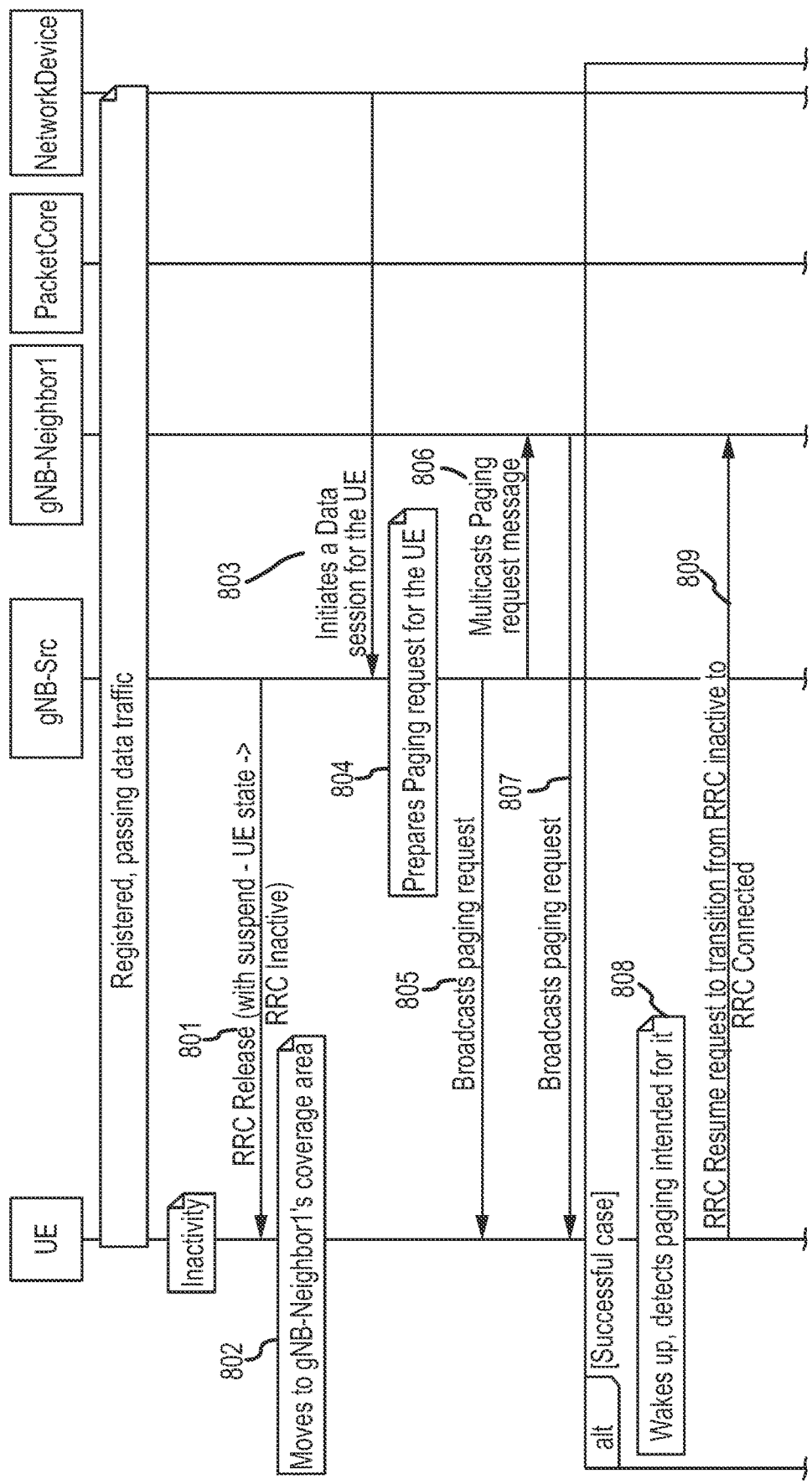
FIG. 8A is a first part of a sequence diagram depicting operations for paging support with local user plane function (L-UPF) at gNB in accordance with some aspects of the disclosed technology.
Figure 8B:
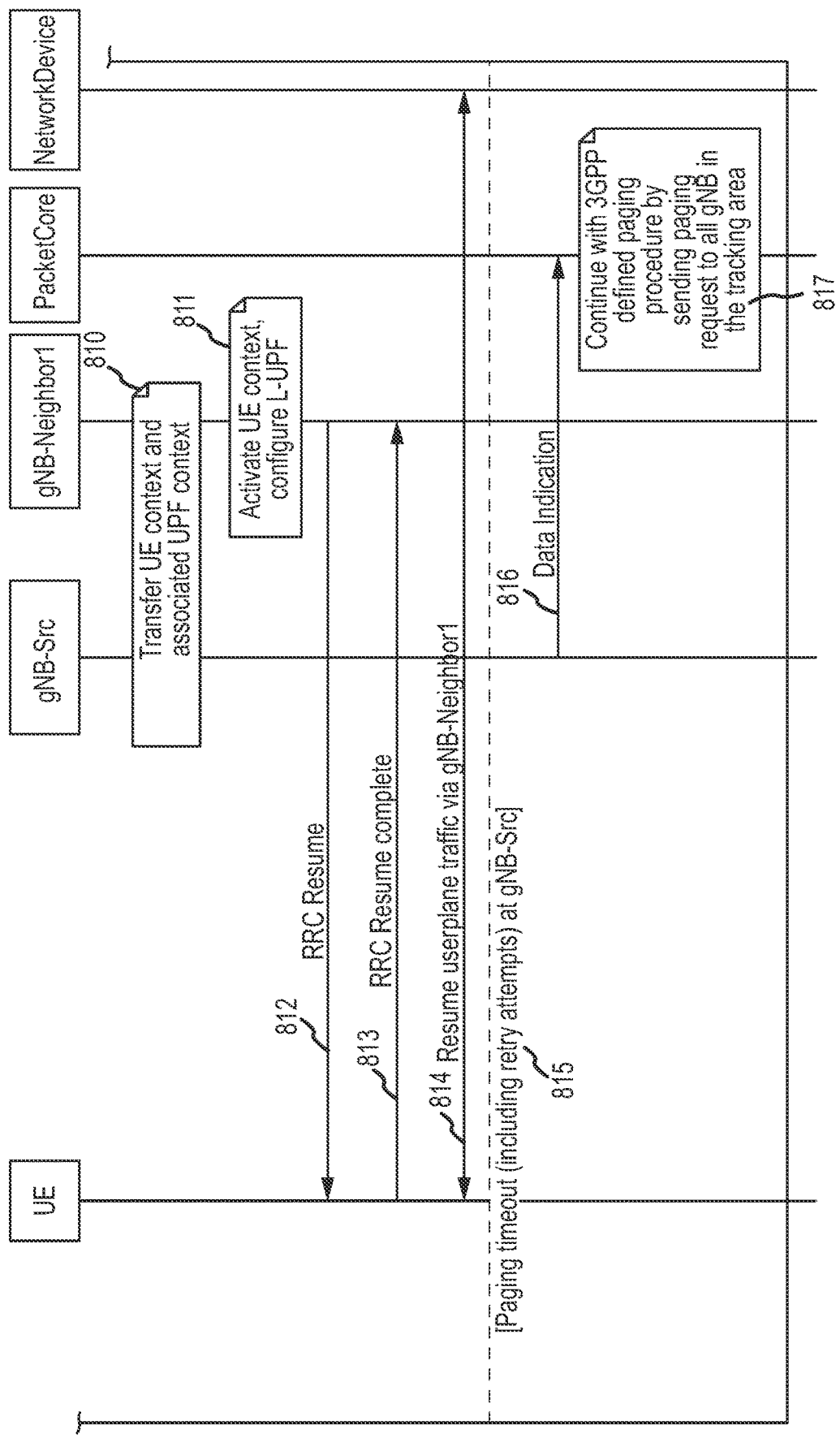
FIG. 8B is a second part of the sequence diagram depicting operations for paging support with local user plane function (L-UPF) at gNB in accordance with some aspects of the disclosed technology.

FIGS. 8A and 8B illustrate a first and second part of a sequence diagram depicting operations for paging support with L-UPF at gNB, in accordance with some aspects of the disclosed technology. As shown, participants include UE, gNB-Source, gNB-Neighbor1, Packet Core, and Network Device. The Network Device in the sequence diagram the switch 314 and/or 310A-310B and DHCP/Router 312.

To begin, the UE, the gNB-source, the Network Device are registered, ready for passing data traffic.

At 801, the gNB-Src sends the UE "RRC Release (with suspend—UE state->RRC_Inactive)."

At 802, the UE moves to the gNB-Neighbor1's coverage area.

At 803, the Network Device sends the gNB-Src a message "Initiates a Data session for the UE."

At 804, the gNB-Src prepares a paging request for the UE.

At 805, the gNB-Src sends the UE "Broadcasts paging request."

At 806, the gNB-Src sends the gNB-Neighbor1 "Multicasts Paging request message."

At 807, the gNB-Neighbor1 sends the UE "Broadcasts paging request."

At 808, the UE wakes up and detects the paging intended for itself.

At 809, the UE sends the gNB-Neighbor1 "RRC Resume request to transition from RRC Inactive to RRC Connected."

At 810, the UE context and associated UPF context are based on GUTI transfer between the gNB-Neighbor1 and the gNB-source.

At 811, the gNB-Neighbor1 activates UE context and configures L-UPF.

At 812, the gNB-Neighbor1 sends the UE a message "RRC Resume."

At 813, the UE sends the gNB-Neighbor1 a message "RRC Resume complete."

At 814, the UE and the Network Device resume user plane traffic via gNB-Neighbor1.

At 815, paging timeout (including retry attempts) occurs at gNB-Source

At operation 816, the gNB-source sends the Packet Core "Data Indication."

At 817, the Packet Core continues with 3GPP defined paging procedure by sending paging requests to all gNBs in the tracking area.

In some embodiments, the UE may access a single subnet or a single DNN including devices 310A and 310B on the enterprise network, as illustrated in FIG. 3.

In some embodiments, the UE may wish to access different subnets or different DNNs.

By implementing UPFs at each gNB, UPF instances are in a single deployment, which also complicates multiple PDN/DNN support. Multiple PDN/DNNs support independent services, such as voice, video, and data services, among others. It is also possible to support multiple slices with different QoS, security, and privacy requirements. Typically, multiple UPF instances are deployed for multiple PDNs or DNNs, with one UPF per PDN or DNN. However, with the UPF being collocated with the gNB, supporting multi-PDN or DNN requires a slightly different architecture. The enterprise local breakout architecture provides a solution for multi-PDN/DNN support.

In the enterprise local breakout architecture, the functionality of L-UPF can be extended to support Multi-PDN/DNN features by implementing a plurality of vLANs for a plurality of DNNs, one vLAN per DNN. The L-UPF maintains a forwarding UE context per DNN, which includes a UE IP address per DNN received from the enterprise DHCP server.

Figure 9:
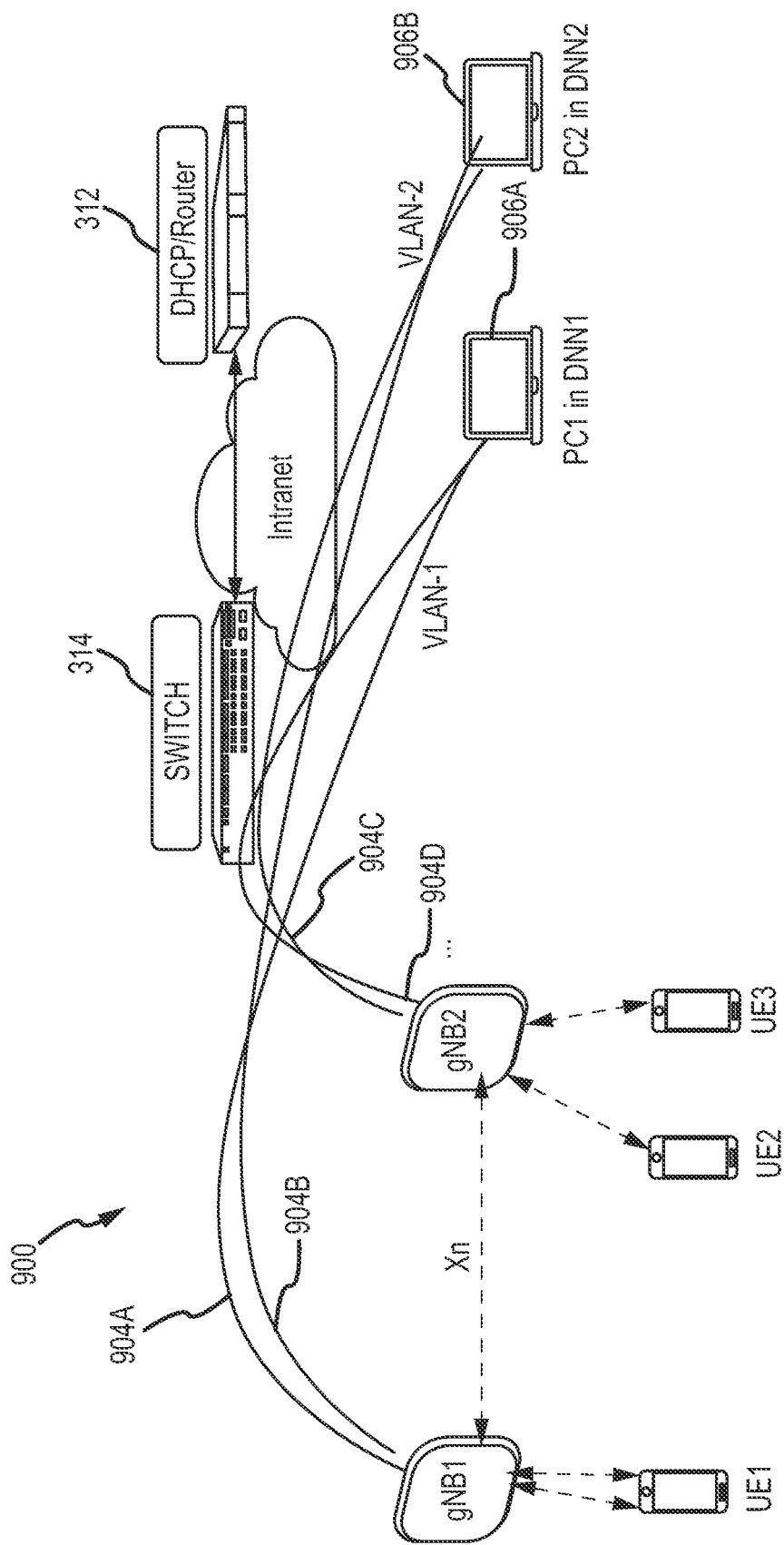
FIG. 9 is a system diagram illustrating multi-data network name (DNN) support with local breakout in accordance with some aspects of the disclosed technology.

FIG. 9 is a system diagram illustrating multi DNN support with local breakout architecture, in accordance with some aspects of the disclosed technology. As shown, in an enterprise local breakout architecture 900, a first 5G user or UE1 can access to a first device 906A (e.g. personal computer 1 or PC1) in a first subnet DNN1 via a first path 904A and a first vLAN (vLAN-1). The first 5G user or UE1 can also access a second device 906B (e.g. personal computer 2 or PC2) in a second subnet DNN2 via a second path 904B and a second vLAN (vLAN-2). Likewise, a second 5G user or UE2 can access the PC2 in the second subnet DNN2 via a third path 904C and vLAN-2. A third 5G user or UE3 can access the PC1 in the first subnet DNN1 via a fourth path 904D and vLAN-1.

Without VLAN, the UE can access one subnet or one DNN. With VLANs, the UEs can access different subnets or different DNNs. For example, a UE configured for enterprise voice service along with data service can get two IP addresses from different subnets, such as voice service and data service. The L-UPF uses different vLANs to exchange packets destined for voice service and data service over the wired infrastructure. These are mapped to different bearers on the wireless side. Independently, QoS policies, security/privacy policies can be enforced on these vLANs, which allows implementation of different network slices. Subscriber-specific policies can be received from the Packet Core during registration as shown in FIG. 5. The DNN to VLAN mapping and security/privacy policies for each DNN can be configured from the Management system.

Figure 10A:
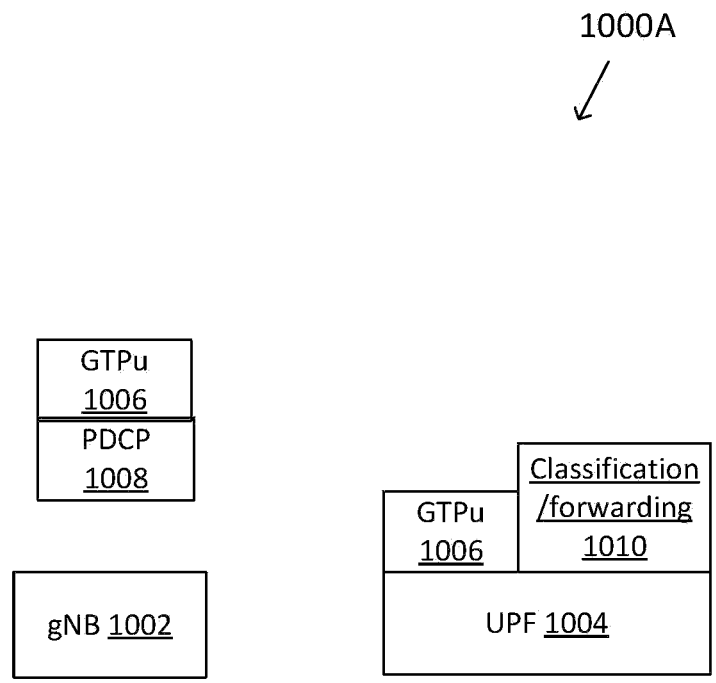
FIG. 10A is a system diagram illustrating one configuration of user plane stack in accordance with some aspects of the disclosed technology.
Figure 10B:
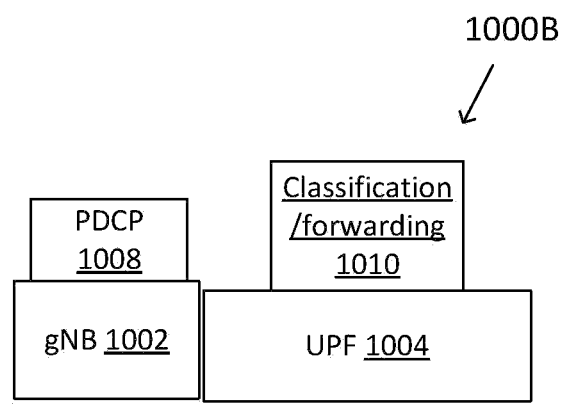
FIG. 10B is a system diagram illustrating another configuration of user plane stack in accordance with some aspects of the disclosed technology.

FIGS. 10A-B are system diagrams illustrating (A) one configuration of user plane stack 1000A, (B) another configuration of user plane stack 1000B, in accordance with some aspects of the disclosed technology. Referring to FIG. 10A now, UPF 1004 is the point of entry or the exit for the packet towards 5G network. Each packet is classified by classification/forwarding function 1010 to identify to which UE it belongs and to which protocol data unit (PDU)/Slice it belongs. Accordingly, Quality of Service (QoS) policies are enforced, and the packets are forwarded by the classification/forwarding function 1010 to the gNB 1002 over General Packet Radio Service (CPRS) Tunneling Protocol (GTP)u tunnel 1006, as illustrated in FIG. 10A. There exists one GTPu tunnel per PDU session per UE. Packet Data Convergence Protocol (PDCP) layer 1008 of the gNB 1002 receives the IP datagrams received over GTPu tunnel 1006, identifies the UE, QoS information based on metadata of the GTPu header, applies Ciphering and forwards it to Radio link control (RLC)/layer 2 (L2) Medium access control (MAC) for transmitting over the air. RlX/MAC block is the basic transport unit on the air interface that is used between the mobile and the network. In an uplink direction, when packets are received from the UE, PDCP layer 1008 deciphers the data, forwards the data to UPF 1004 over GTPu tunnel 1006. Then, UPF 1004 forwards the received IP packets to a wired network by appending the ethernet header.

With the U-plane stack 1000B as illustrated in FIG. 10B ethernet frames received from the network are classified directly at the gNB 1002 and sent to the PDCP layer 1008 for further processing by classification/forwarding function 1010. This eliminates the maximum transmission unit (MTU) related challenges including fragmentation associated with additional GTPu header and unnecessary processing involved.

Figure 11:
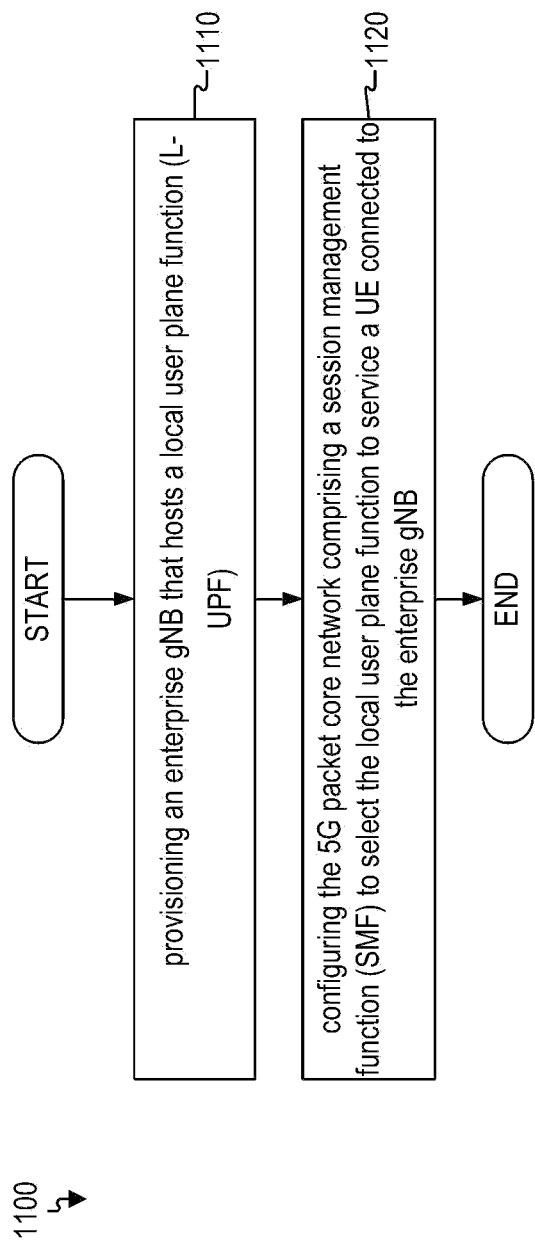
FIG. 11 illustrates an example method 1100 for UE registration call flow with local UPF at gNB in accordance with some aspects of the disclosed technology.

FIG. 11 illustrates an example method 1100 for UE registration call flow with a local UPF at a gNB. Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

According to some examples, the method 1100 includes provisioning the enterprise gNB at block 1110. For example, a network administrator of the may provision the enterprise gNB, where the enterprise gNB hosts a local user plane function (L-UPF)

According to some examples, the method 1100 includes configuring the 5G packet core network comprising a session management function (SMF) to select the local user plane function to service a UE connected to the enterprise gNB at block 1120. For example, the 5G network in the cloud 306 as illustrated in FIG. 3 may configure the 5G packet core network comprising a session management function (SMF) to select the local user plane function to service a UE connected to the enterprise gNB.

In some embodiments, configuring the 5G packet core network may include using NSSAI from NGSetup Request, by the AMF to determine whether the enterprise gNB is capable of supporting local breakout functionality. Additionally, the AMF receives the IP address for the UE from the SMF and sends an Initial Context Setup request/NAS-PDU to the enterprise gNB to indicate "Registration Accept."

Figure 12:
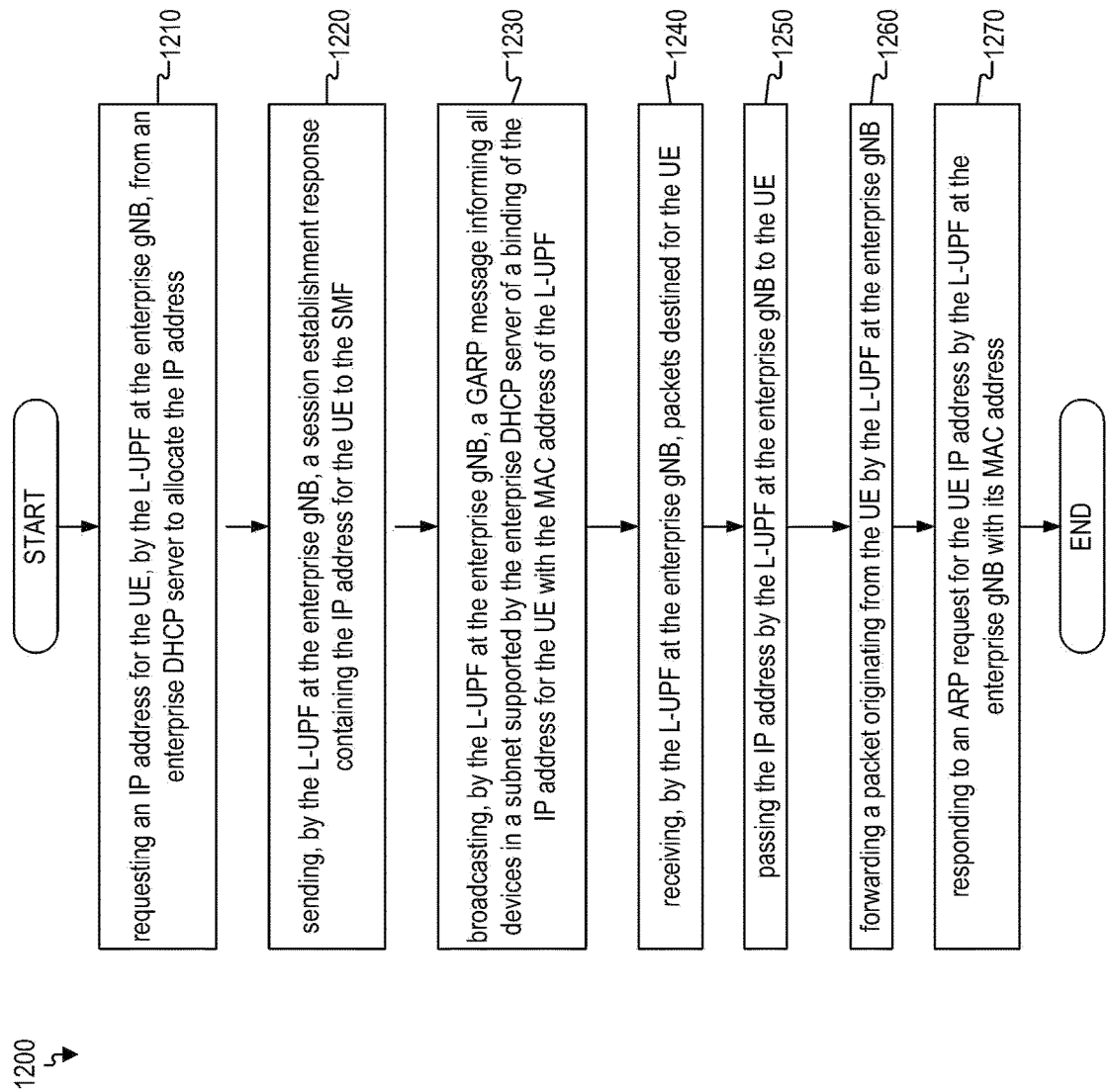
FIG. 12 illustrates an example method 1200 for providing an enterprise gNB for connection to a 5G packet core network in accordance with some aspects of the disclosed technology.

FIG. 12 illustrates an example method 1200 for providing an enterprise gNB for connection to a 5G packet core network. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

According to some examples, the method 1200 includes requesting an IP address for the UE from an enterprise DHCP server to allocate the IP address at block 1210. For example, the L-UPF at the enterprise gNB as illustrated in FIG. 3 may request an IP address for the UE from an enterprise DHCP server to allocate the IP address.

According to some examples, the method 1200 includes sending a session establishment response containing the IP address for the UE to the SMF at block 1220. For example, the L-UPF at the enterprise gNB as illustrated in FIG. 3 may send a session establishment response containing the IP address for the UE to the SMF.

According to some examples, the method 1200 includes broadcasting a Gratuitous Address Resolution Protocol (GARP) message informing all switches 312 in a subnet supported by the enterprise DHCP server 312 of a binding of the IP address for the UE with the MAC address of the L-UPF at block 1230. For example, the L-UPF at the enterprise gNB as illustrated in FIG. 3 may broadcast a Gratuitous Address Resolution Protocol (GARP) message informing all switches and routers in a subnet supported by the enterprise DHCP server of a binding of the IP address for the UE with the MAC address of the L-UPF.

In some embodiments, the IP address of the UE is maintained by the L-UPF at the source gNB when the UE is connected or in an idle mode, and the IP address is released when the UE deregisters with the Packet Core.

According to some examples, the method 1200 includes receiving, by the L-UPF at the enterprise gNB, packets destined for the UE at block 1240. For example, the L-UPF at the enterprise gNB as illustrated in FIG. 3 may receive packets destined for the UE.

According to some examples, the method 1200 includes passing the IP address by the L-UPF at the enterprise gNB to the UE at block 1250.

According to some examples, the method 1200 includes forwarding a packet originating from the UE to the devices on the enterprise network at block 1260. For example, the L-UPF at the enterprise gNB as illustrated in FIG. 3 may forward a packet originating from the UE to the devices 310A-B on the enterprise network via network device 314.

In some embodiments, the L-UPF at the enterprise gNB appends a MAC header with the MAC address of the L-UPF at the enterprise gNB as a source.

According to some examples, the method 1200 includes responding to an ARP request for the UE IP address by the enterprise gNB with its MAC address at block 1270. For example, the L-UPF at the enterprise gNB as illustrated in FIG. 3 may respond to an ARP request for the UE IP address with its MAC address.

Figure 13:
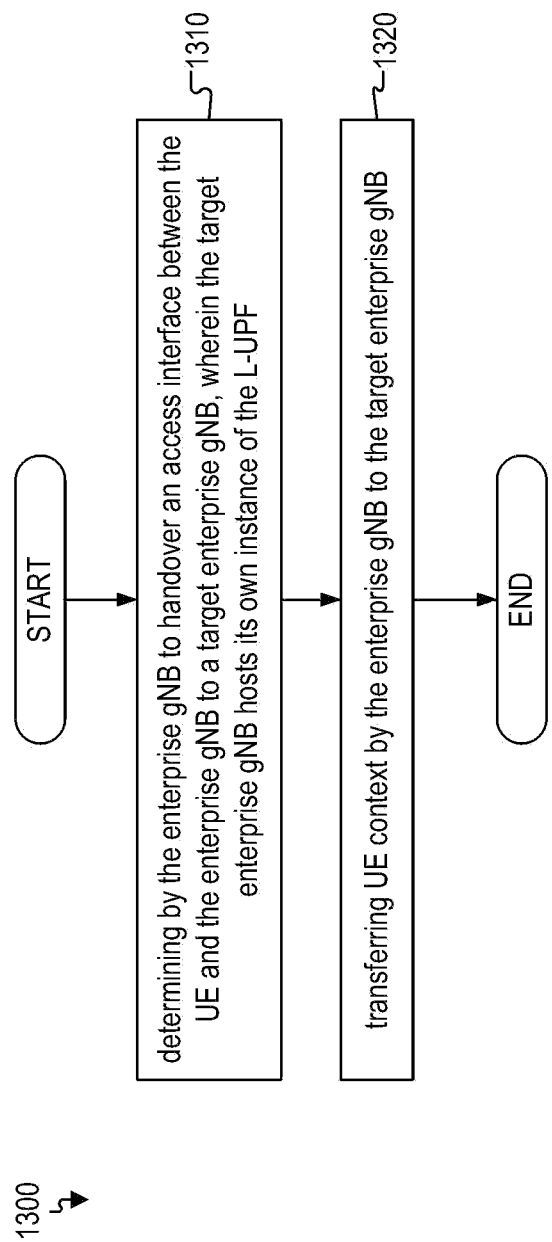
FIG. 13 illustrates an example method 1300 for UE handover call flow from one gNB to another gNB in accordance with some aspects of the disclosed technology.

FIG. 13 illustrates an example method 1300 for UE handover call flow from one gNB to another gNB. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

According to some examples, the method 1300 includes determining by the enterprise gNB to hand over an access interface between the UE and the enterprise gNB to a target enterprise gNB at block 1310. For example, the enterprise gNB as illustrated in FIG. 6 may determine to hand over an access interface between the UE and the enterprise gNB as a source to a target enterprise gNB.

According to some examples, the method 1300 includes transferring UE context at block 1320. For example, the source enterprise gNB as illustrated in FIG. 6 may transfer the UE context to the target enterprise gNB.

In some embodiments, the UE context includes the UE IP address. The UE context is the one maintained by the gNB. The UE context includes Security context, and other information.

In some embodiments, the UPF context includes the UE IP address. The UPF context is also for the UE, but it is primarily for forwarding only, such as IP address, Classification, traffic policies etc.

In some embodiments, the L-UPF at the target enterprise gNB is configured to use the same IP address for the UE as the L-UPF at the source enterprise gNB when the UE moves from the source enterprise gNB to the target enterprise gNB.

Figure 14:
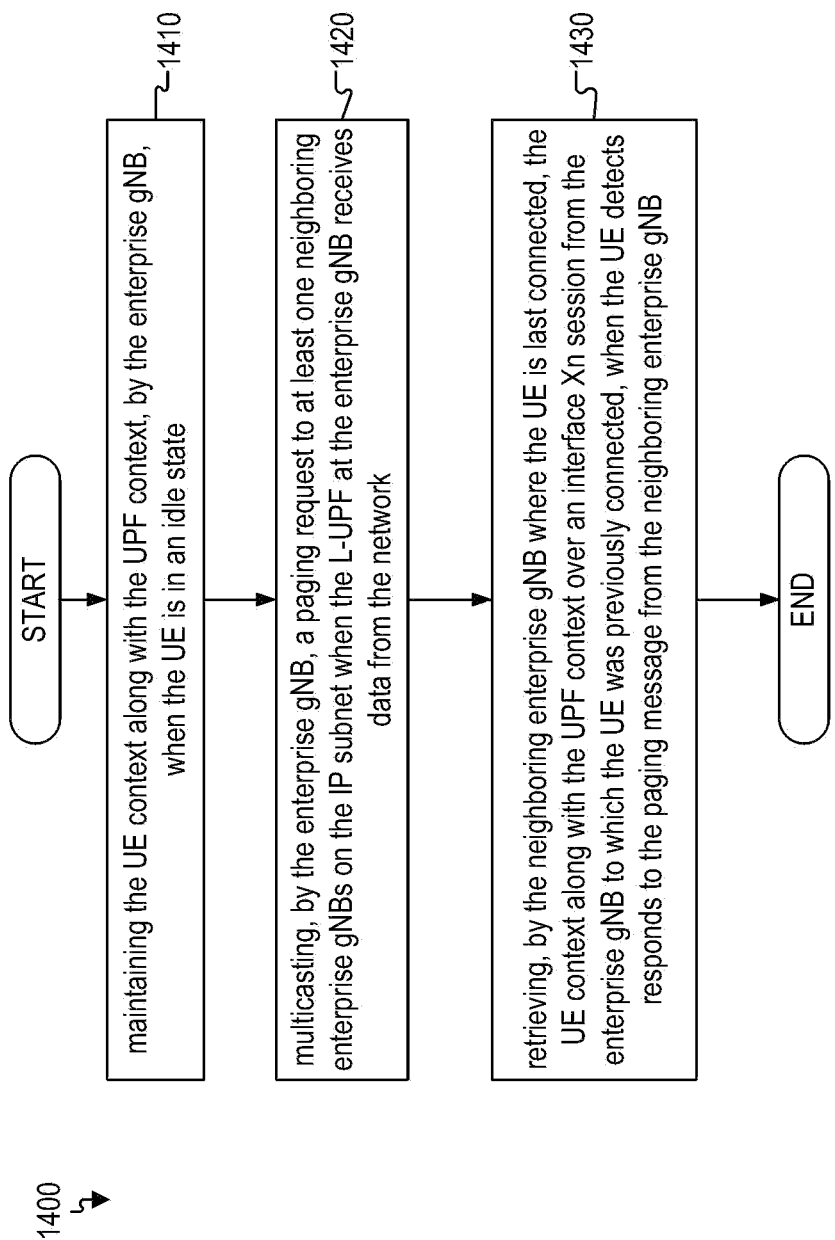
FIG. 14 illustrates an example method 1400 for paging support with L-UPF at gNB in accordance with some aspects of the disclosed technology.

FIG. 14 illustrates an example method 1400 for paging support with L-UPF at gNB. Although the example method 1400 depicts a particular sequence of operations, the sequence may be altered without departing from the scope of the present disclosure. For example, some of the operations depicted may be performed in parallel or in a different sequence that does not materially affect the function of the method 1400. In other examples, different components of an example device or system that implements the method 1400 may perform functions at substantially the same time or in a specific sequence.

According to some examples, the method 1400 includes maintaining the UE context along with the UPF context, by the enterprise gNB, when the UE is in an idle state at block 1410. For example, the enterprise gNB as illustrated in FIG. 3 may maintain the UE context along with the UPF context when the UE is in an idle state.

According to some examples, the method 1400 includes multicasting, by the enterprise gNB, a paging request to at least one neighboring enterprise gNBs on the IP subnet when the L-UPF at the enterprise gNB receives data from the network at block 1420. For example, the enterprise gNB as illustrated in FIG. 3 may multicast a paging request to at least one neighboring enterprise gNBs on the IP subnet when the L-UPF at the enterprise gNB receives data from the network.

According to some examples, the method 1400 includes retrieving, by the neighboring enterprise gNB where the UE is last connected, the UE context along with the UPF context over an interface Xn session from the enterprise gNB to which the UE was previously connected, when the UE detects responds to the paging message from the neighboring enterprise gNB at block 1430.

Figure 15:
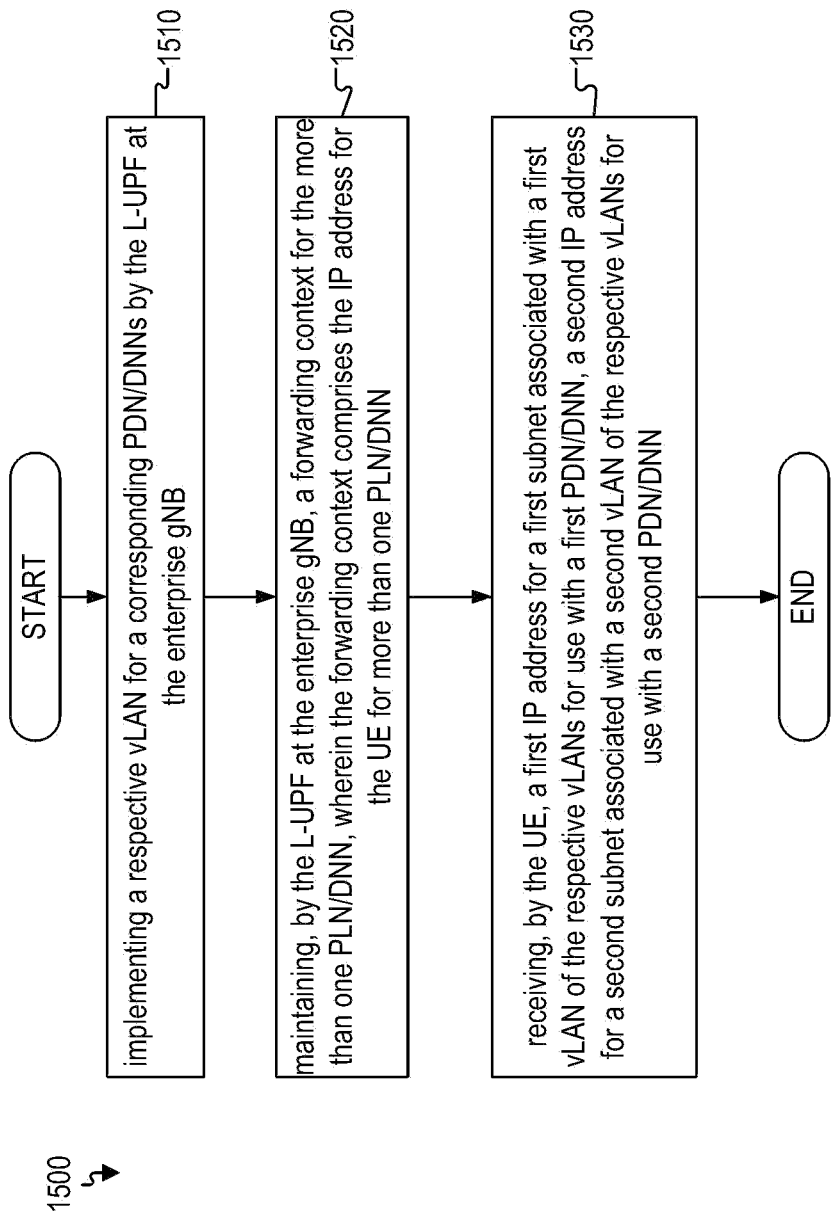
FIG. 15 illustrates an example method 1500 for multi-data network name (DNN) support with local breakout in accordance with some aspects of the disclosed technology.
Figure 16:
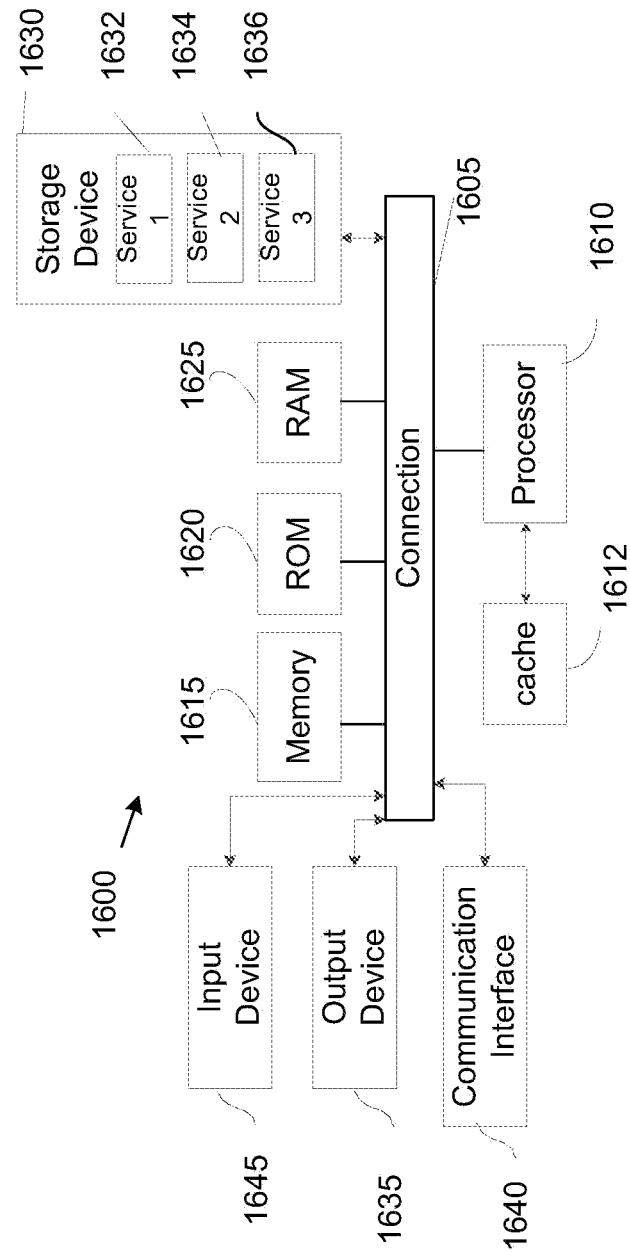
FIG. 16 shows an example of computing system 1600 in accordance with some aspects of the disclosed technology.

FIG. 15 illustrates an example method 1500 for multi-data network name (DNN) support using local breakout architecture. Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

In some embodiments, the L-UPF hosted by the enterprise gNB supports more than one PDN/DNN.

According to some examples, the method 1500 includes implementing a respective vLAN for a corresponding PDN/DNNs by the L-UPF at the enterprise gNB at block 1510. For example, the L-UPF at the enterprise gNB as illustrated in FIG. 9 may implement a respective vLAN for a corresponding PDN/DNNs.

According to some examples, the method 1500 includes maintaining, by the L-UPF at the enterprise gNB, a forwarding context for the more than one PLN/DNN at block 1520. For example, the L-UPF at the enterprise gNB as illustrated in FIG. 9 may maintain a forwarding context for the more than one PLN/DNN.

According to some examples, the method 1500 includes receiving, by the UE, a first IP address for a first subnet associated with a first vLAN of the respective vLANs for use with a first PDN/DNN, a second IP address for a second subnet associated with a second vLAN of the respective vLANs for use with a second PDN/DNN at block 1530. For example, the UE as illustrated in FIG. 9 may receive a first IP address for a first subnet associated with a first vLAN of the respective vLANs for use with a first PDN/DNN, a second IP address for a second subnet associated with a second vLAN of the respective vLANs for use with a second PDN/DNN.

FIG. 16 shows an example of computing system 1600, which can be for example any computing device making up any of the entities illustrated in FIG. 3, for example, gNB 302A-B, or any component thereof in which the components of the system are in communication with each other using connection 1605. Connection 1605 can be a physical connection via a bus, or a direct connection into processor 1610, such as in a chipset architecture. Connection 1605 can also be a virtual connection, networked connection, or logical connection.

In some embodiments, computing system 1600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that couples various system components including system memory 1615, such as read-only memory (ROM) 1620 and random access memory (RAM) 1625 to processor 1610. Computing system 1600 can include a cache of high-speed memory 1612 connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms known to those of skill in the art. In some instances, multimodal systems can enable a user to provide multiple types of input/output to communicate with computing system 1600. Computing system 1600 can include communications interface 740, which can generally govern and manage the user input and system output. There is no restriction on operating on any particular hardware arrangement, and therefore the basic features here may easily be substituted for improved hardware or firmware arrangements as they are developed.

Storage device 1630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1630 can include software services, servers, services, etc., that when the code that defines such software is executed by the processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for providing a handover call flow, the method comprising:
   determining, by an enterprise gNB, to hand over an access interface between a user equipment (UE) and the enterprise gNB to a target enterprise gNB;
   transferring a UE context to the target enterprise gNB;
   configuring a local user plane function (L-UPF) hosted by the target enterprise gNB to use a same IP address for the UE as the L-UPF at the enterprise gNB when the UE moves from the enterprise gNB to the target enterprise gNB;
   requesting an IP address for the UE, by the L-UPF at the enterprise gNB, from an enterprise DHCP server to allocate the IP address;
   sending, by the L-UPF at the enterprise gNB, a session establishment response containing the IP address for the UE to a session management function (SMF); and
   broadcasting, by the L-UPF at the enterprise gNB, a Gratuitous Address Resolution Protocol (GARP) message informing all devices in a subnet supported by the enterprise DHCP server of a binding of the IP address for the UE with a MAC address of the L-UPF.

2. The method of claim 1, wherein the enterprise gNB determines to hand over the access interface between the UE and the enterprise gNB as a source to the target enterprise gNB.

3. The method of claim 1, wherein the UE context comprises security context maintained by the enterprise gNB.

4. The method of claim 3, wherein the UE context includes an IP address of the UE.

5. The method of claim 1, the method further comprising:
   configuring a 5G packet core network comprising a session management function (SMF) to select the L-UPF to service the UE connected to the enterprise gNB.

6. The method of claim 1, wherein the configuring a 5G packet core network further comprises:
   using NSSAI from NGSetup Request, by an access and mobility management function (AMF) to determine whether the enterprise gNB is capable of supporting local breakout functionality;
   receiving the IP address for the UE from an SMF, by the AMF; and
   sending, by the AMF, an Initial Context Setup request/NAS-PDU to the enterprise gNB to indicate Registration Accept.

7. The method of claim 1, further comprising:
   wherein the L-UPF hosted by the enterprise gNB supports more than one public data network/data network name (PDN/DNN), the method further comprising:
   implementing a respective vLAN for a corresponding PDN/DNNs by the L-UPF at the enterprise gNB; and
   maintaining, by the L-UPF at the enterprise gNB, a forwarding context for the more than one PDN/DNN, wherein the forwarding context comprises the IP address for the UE for more than one PDN/DNN.

8. The method of claim 1, further comprising:
   when the UE is in an idle state, maintaining the UE context along with UPF context, by the enterprise gNB;

when the L-UPF at the enterprise gNB receives data from a network,
multicasting, by the enterprise gNB, a paging request to at least one neighboring enterprise gNBs on an IP subnet.

9. A system comprising:
a storage configured to store instructions; and
a processor configured to execute the instructions and cause the processor to:
determine, by an enterprise gNB, to hand over an access interface between a user equipment (UE) and the enterprise gNB to a target enterprise gNB;
transfer a UE context to the target enterprise gNB;
configure a local user plane function (L-UPF) hosted by the target enterprise gNB to use a same IP address for the UE as the L-UPF at the enterprise gNB when the UE moves from the enterprise gNB to the target enterprise gNB;
request an IP address for the UE, by the L-UPF at the enterprise gNB, from an enterprise DHCP server to allocate the IP address;
send, by the L-UPF at the enterprise gNB, a session establishment response containing the IP address for the UE to a session management function (SMF); and
broadcast, by the L-UPF at the enterprise gNB, a Gratuitous Address Resolution Protocol (GARP) message informing all devices in a subnet supported by the enterprise DHCP server of a binding of the IP address for the UE with a MAC address of the L-UPF.

10. The system of claim 9, wherein the enterprise gNB determines to hand over the access interface between the UE and the enterprise gNB as a source to the target enterprise gNB.

11. The system of claim 9, wherein the UE context comprises security context maintained by the enterprise gNB.

12. The system of claim 11, wherein the UE context includes an IP address of the UE.

13. The system of claim 9, wherein the processor is configured to execute the instructions and cause the processor to:
configure a 5G packet core network comprising a session management function (SMF) to select the L-UPF to service the UE connected to the enterprise gNB.

14. The system of claim 9, wherein the processor is configured to execute the instructions and cause the processor to:
use NSSAI from NGSetup Request, by an access and mobility management function (AMF) to determine whether the enterprise gNB is capable of support local breakout functionality;
receive the IP address for the UE from an SMF, by the AMF; and
send, by the AMF, an Initial Context Setup request/NAS-PDU to the enterprise gNB to indicate Registration Accept.

15. A non-transitory computer readable medium comprising instructions, the instructions, when executed by a computing system, cause the computing system to:
determine, by an enterprise gNB, to hand over an access interface between a user equipment (UE) and the enterprise gNB to a target enterprise gNB;
transfer a UE context to the target enterprise gNB;
configure a local user plane function (L-UPF) hosted by the target enterprise gNB to use a same IP address for the UE as the L-UPF at the enterprise gNB when the UE moves from the enterprise gNB to the target enterprise gNB;
request an IP address for the UE, by the L-UPF at the enterprise gNB, from an enterprise DHCP server to allocate the IP address;
send, by the L-UPF at the enterprise gNB, a session establishment response containing the IP address for the UE to a session management function (SMF); and
broadcast, by the L-UPF at the enterprise gNB, a Gratuitous Address Resolution Protocol (GARP) message informing all devices in a subnet supported by the enterprise DHCP server of a binding of the IP address for the UE with a MAC address of the L-UPF.

16. The computer readable medium of claim 15, wherein the enterprise gNB determines to hand over the access interface between the UE and the enterprise gNB as a source to the target enterprise gNB.

17. The computer readable medium of claim 15, wherein the UE context comprises security context maintained by the enterprise gNB.

18. The computer readable medium of claim 17, wherein the UE context includes an IP address of the UE.

* * * * *